US012263746B2

(12) United States Patent
Eull et al.

(10) Patent No.: US 12,263,746 B2
(45) Date of Patent: Apr. 1, 2025

(54) NON-ISOLATED DC FAST CHARGER FOR ELECTRIFIED VEHICLES

(71) Applicants: The Trustees of Columbia University in the City of New York, New York, NY (US); Longmax Corporation Ltd., Tsim Sha Tsui (HK)

(72) Inventors: William-Michael Eull, New York, NY (US); Liwei Zhou, New York, NY (US); Weizhong Wang, New York, NY (US); Gangqi Cen, Tsim Sha Tsui (HK); Matthias Preindl, New York, NY (US)

(73) Assignees: The Trustees of Columbia University in the City of New York, New York, NY (US); Longmax Corporation Ltd., Tsim Sha Tsui (HK)

(*) Notice: Subject to any disclaimer, the term of this patent is extended or adjusted under 35 U.S.C. 154(b) by 0 days.

(21) Appl. No.: 18/415,333

(22) Filed: Jan. 17, 2024

(65) Prior Publication Data

US 2024/0399907 A1    Dec. 5, 2024

Related U.S. Application Data

(63) Continuation of application No. 17/173,524, filed on Feb. 11, 2021, now Pat. No. 11,912,147.

(Continued)

(51) Int. Cl.
*H02J 7/00* (2006.01)
*B60L 53/30* (2019.01)
(Continued)

(52) U.S. Cl.
CPC ............... *B60L 53/30* (2019.02); *H02J 7/06* (2013.01); *H02M 1/44* (2013.01); *H02M 3/158* (2013.01);
(Continued)

(58) Field of Classification Search
USPC ................. 320/106, 107, 108, 109, 110, 112
See application file for complete search history.

(56) References Cited

U.S. PATENT DOCUMENTS

| 2013/0147419 A1 | 6/2013 | Sakai et al. |
| 2015/0061569 A1* | 3/2015 | Alexander ............. B60L 53/63 320/109 |

(Continued)

FOREIGN PATENT DOCUMENTS

| CN | 101814766 | 8/2010 |
| CN | 103155388 | 2/2016 |

(Continued)

OTHER PUBLICATIONS

Extended European Search Report for European Application No. 21157978.4, mailed May 31, 2021, 7 Pages.

(Continued)

*Primary Examiner* — Brian Ngo
(74) *Attorney, Agent, or Firm* — DLA PIPER LLP (US)

(57) ABSTRACT

A system may mitigate leakage currents in charging stations for electric vehicles. The system may include a bank of one or more parallel capacitors per phase electrically coupled to an AC voltage source, wherein a neutral point of the one or more parallel capacitors is electrically coupled to a DC ground; a bank of one or more inductors per phase electrically coupled to the one or more parallel capacitors, wherein each inductor is in series with and downstream from one capacitor; a rectifier electrically coupled to and downstream from the one or more parallel inductors, wherein the rectifier converts the AC voltage source to a DC voltage for supply to a battery; a DC bus electrically coupled to the rectifier; and a controller, wherein the controller is configured to mitigate leakage currents by controlling a voltage of at least one of the bank of one or more parallel capacitors.

20 Claims, 20 Drawing Sheets

Related U.S. Application Data

(60) Provisional application No. 62/979,935, filed on Feb. 21, 2020.

(51) Int. Cl.
*H02J 7/06* (2006.01)
*H02M 1/44* (2007.01)
*H02M 3/158* (2006.01)
*H02M 7/219* (2006.01)

(52) U.S. Cl.
CPC ......... *H02M 7/219* (2013.01); *B60L 2210/10* (2013.01); *H02J 2207/20* (2020.01)

(56) References Cited

U.S. PATENT DOCUMENTS

| 2016/0365804 | A1 | 12/2016 | Nakagawa et al. |
| 2017/0288567 | A1* | 10/2017 | Taguchi ................. F04B 39/02 |
| 2019/0372465 | A1 | 12/2019 | Xu et al. |
| 2020/0156489 | A1* | 5/2020 | Tombelli .................. H02J 7/02 |
| 2020/0357549 | A1 | 11/2020 | Nakagawa et al. |

FOREIGN PATENT DOCUMENTS

| CN | 106252031 | 12/2016 | |
| CN | 109687722 | 4/2019 | |
| CN | 110167788 | 8/2019 | |
| CN | 209516951 | 10/2019 | |
| WO | WO-2017078115 A1 * | 5/2017 | .......... H02M 1/4208 |
| WO | 2018/208991 | 11/2018 | |
| WO | WO-2018202462 A1 * | 11/2018 | ............. B60L 50/40 |
| WO | WO-2020035527 A1 * | 2/2020 | ............. B60L 53/12 |

OTHER PUBLICATIONS

Office Action for CN Patent Application No. 202110198010.0, dated Aug. 27, 2024, 6 pages.
European Search Report for European Application No. 21157978.4, mailed Jul. 23, 2024, 5 Pages.

* cited by examiner

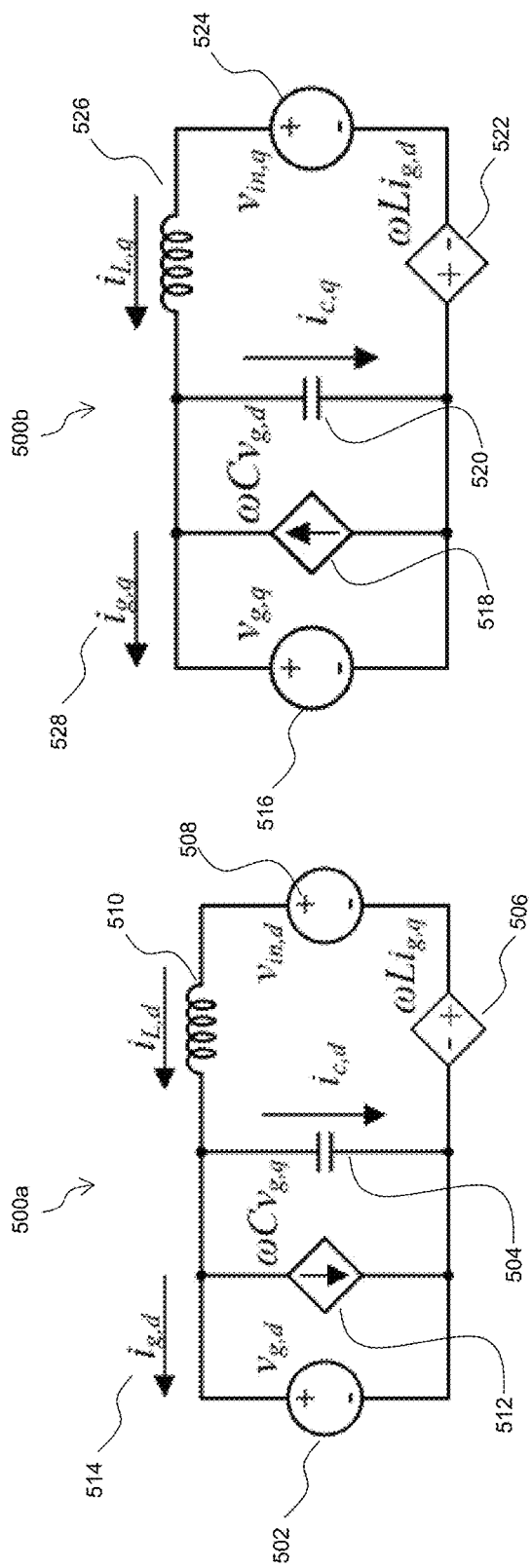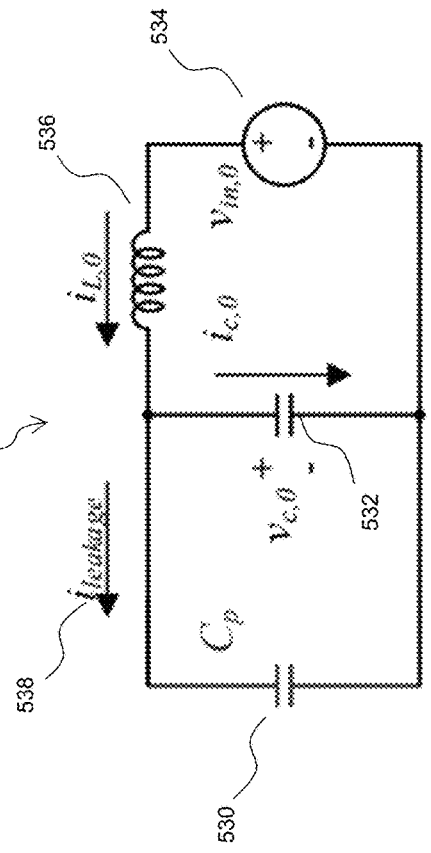
FIG. 5A
FIG. 5B
FIG. 5C

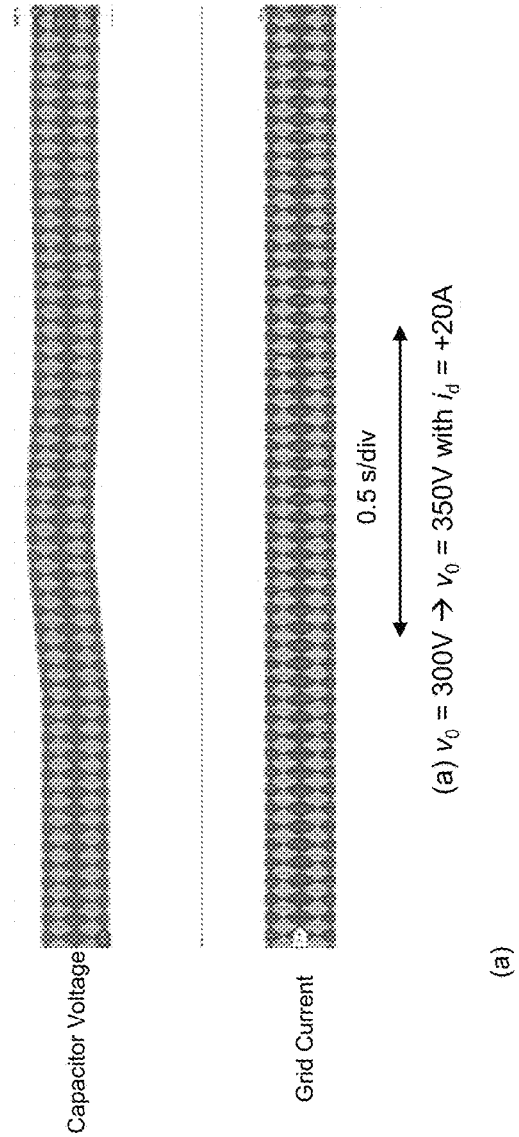
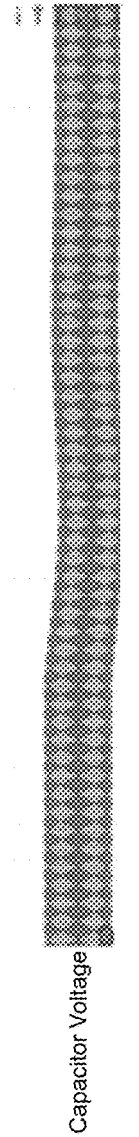
FIG. 7A (a) $v_0 = 300V \rightarrow v_0 = 350V$ with $i_d = +20A$
FIG. 7B (b) $v_0 = 300V \rightarrow v_0 = 250V$ with $i_d = +20A$

| Grid interface | | | | | |
|---|---|---|---|---|---|
| Grid standard | International (IEC) | | USA (IEEE, NEMA) | | |
| Grid configuration | 240V, 50Hz | 400V, 50Hz | 120V, 60Hz | 240V, 60Hz | |
| Min. DC bus | 390V | 650V | 200V | 390V | |
| Rated module current | 32A | | | | |
| Rated module power | 7.7kW | 22kW | 3.8kW | 7.7kW | |
| DC/DC converter | | | | | |
| Battery voltage (min, max) | 200V | | 500V–650V | | |
| Rated module current | 3 × 32A | | | | |
| Rated power | Given by grid interface | | | | |

*FIG. 16*

NON-ISOLATED DC FAST CHARGER FOR ELECTRIFIED VEHICLES

CROSS REFERENCE TO RELATED APPLICATIONS

This application is a continuation of U.S. patent application Ser. No. 17/173,524 filed Feb. 11, 2021, which claims priority to U.S. Provisional Application No. 62/979,935, filed Feb. 21, 2020, which are herein incorporated by reference in their entireties.

BACKGROUND

Electric vehicles continue to face cost and range anxiety challenges that limit their adoption rate. Both issues are being tackled through advances in semiconductor materials, batteries and control techniques. However, a third major impediment that is intrinsically linked to range anxiety persists: charging infrastructure. Without appropriate infrastructure to rapidly charge an electric vehicle, range anxiety will remain a roadblock. As an example, Tesla Motors has been building the Tesla Supercharger network, with fast chargers placed strategically along major highways around the world to make long distance all-electric travel feasible.

Line frequency transformers are used in many isolated fast charger schemes; however, it's one of the bulkiest, most expensive and least efficient components. Because of its size and cost, it is normally left off the vehicle and forms part of the charging station. As a result of its existence, the size and cost of fast charger units can be exorbitant; furthermore, significant power losses may be incurred, as typical efficiency values for high power three-phase line frequency transformers are in the range of 97-98%. Isolation, however, is a critical component to grid current quality and individual safety when operating charging units with traditional circuit topologies, as parasitic currents can flow through earth to the chassis of the vehicle via the parasitic coupling between the two. Downsizing or outright removing the transformer would lead to a marked reduction in the cost and size of a fast charging unit.

The removal of the transformer from charging stations may be conducive to enabling greater proliferation of fast charging infrastructure and, hence, the adoption of electrified vehicles. However, naively removing it can lead to common mode voltage and earth current issues that degrade grid current quality and present safety issues.

SUMMARY

Embodiments of the present disclosure relate to systems and methods for mitigating leakage currents in charging stations for electric vehicles. According to one aspect of the present disclosure, the system may include a bank of one or more parallel capacitors per phase electrically coupled to an AC voltage source, wherein a neutral point of the one or more parallel capacitors may be electrically coupled to a DC ground; a bank of one or more inductors per phase electrically coupled to the one or more parallel capacitors, wherein each inductor may be in series with and downstream from one capacitor; a rectifier electrically coupled to and downstream from the one or more parallel inductors, wherein the rectifier may convert the AC voltage source to a DC voltage for supply to a battery; a DC bus electrically coupled to the rectifier; and a controller, wherein the controller may be configured to mitigate leakage currents by controlling a voltage of at least one of the bank of one or more parallel capacitors.

In some embodiments, the rectifier may be a three-phase rectifier. In some embodiments, controlling the voltage of at least one of the bank of one or more parallel capacitors may include stabilizing a zero component voltage around a pre-determined value. In some embodiments, the pre-determined value may be one of half of a voltage across the DC bus; or a periodic waveform, wherein an average of the periodic waveform is half the voltage across the DC bus. In some embodiments, stabilizing the zero component voltage may include driving a zero component of the current through at least one of the one or more parallel inductors to a desired current value. In some embodiments, driving the zero component of the current through at least one of the one or more parallel inductors may include applying a DC offset voltage by the rectifier. In some embodiments, at least one of the inductors may include an e-core, 44 turns of Litz wire, and a high frequency ferrite material. In some embodiments, the controller may be a proportional-integral (PI) controller. In some embodiments, the controller may be configured to limit current provided by the rectifier to protect switching devices in the system.

According to another aspect of the present disclosure, a method may mitigate leakage currents in a charging station for electric vehicles. The charging station may include an LC filter which may include a bank of one or more parallel capacitors per phase electrically coupled to and in series with a bank of one or more parallel inductors, a DC bus, and a rectifier, wherein a neutral point of the one or more parallel capacitors may be electrically coupled to a DC ground. The method may include determining a grid phase with a phase-locked loop (PLL) method; determining d-, q-, and 0-components of a voltage across the bank of capacitors, a grid current, and a current through the bank of inductors, wherein each of the voltage, the grid current, and the current through the bank of inductors is measured or estimated; controlling a reactive current within the charging station; controlling an active power of the charging station; determining the 0-component of the current through the bank of inductors that will control the 0-component of the voltage across the bank of capacitors; determining a driving voltage to be applied by the rectifier; and causing the rectifier to apply the driving voltage.

In some embodiments, the method may include limiting current provided by the rectifier to protect switching devices in the charging station. In some embodiments, the method may include using impedance matching to determine a desired reactive current to generate a pre-defined reactive power in the charging station. In some embodiments, controlling the reactive current may include at least one of absorbing reactive current from and providing reactive current to the charging station.

In some embodiments, controlling the active power of the charging station may include holding a voltage across the DC bus constant. In some embodiments, controlling the 0-component of the voltage across the bank of capacitors may include stabilizing the 0-component around a pre-determined value. In some embodiments, the pre-determined value may be half of a voltage across the DC bus; or a periodic waveform, wherein an average of the periodic waveform is half the voltage across the DC bus. In some embodiments, at least one of the inductors may include an e-core, 44 turns of Litz wire, and a high frequency ferrite material. In some embodiments, the method may be performed by at least one PI controller.

According to another aspect of the present disclosure, a system for mitigating leakage currents in a charging station for electric vehicles may include a three-phase LC filter or LCL filter to smooth an AC voltage source; a three-phase rectifier electrically coupled to the LC or LCL filter; a DC bus, wherein a neutral point of the LC filter is connected to a DC ground; and a controller configured to mitigate leakage currents by controlling a voltage of at least one capacitor in the LC filter.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIGS. 5A-5C are dq0 equivalent circuits of the system of FIG. 3, according to some embodiments of the present disclosure.

FIGS. 7A and 7B are experimental validations of the zero sequence voltage control of the non-isolated charging system of FIG. 3.

FIG. 16 shows a table of configuration options for a charger, according to some embodiments of the present disclosure.

Figure 1:
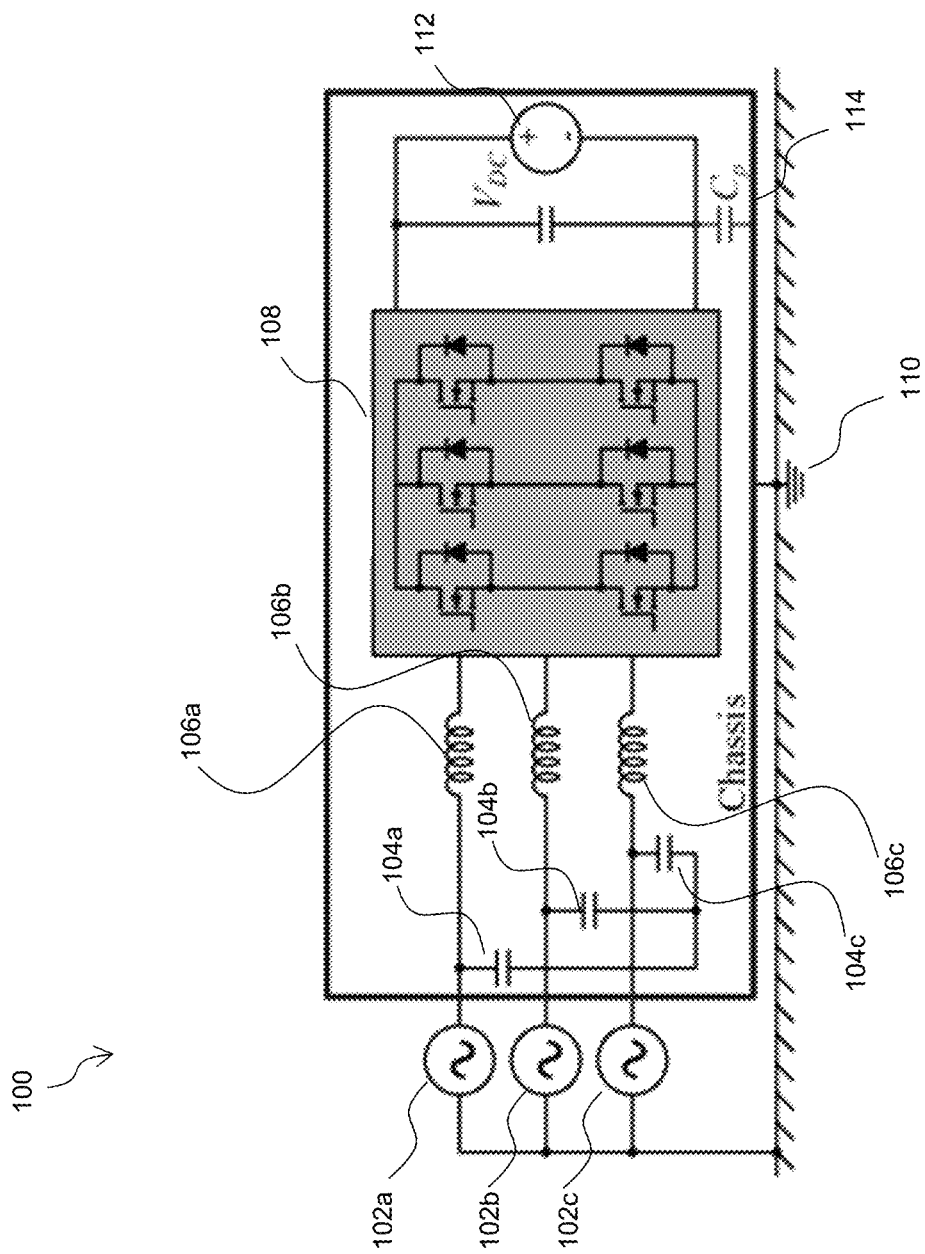
FIG. 1 is a non-isolated charging system that may be susceptible to leakage current issues.

The drawings are not necessarily to scale, or inclusive of all elements of a system, emphasis instead generally being placed upon illustrating the concepts, structures, and techniques sought to be protected herein.

DETAILED DESCRIPTION

The following detailed description is merely exemplary in nature and is not intended to limit the invention or the applications of its use.

A popular avenue for downsizing the transformer has been to employ a high frequency transformer with a high frequency DC/DC converter. While this approach may provide isolation and mitigate leakage currents that occur via parasitic capacitances, as well as a bidirectional interface between the vehicle and grid, it comes at the price of a high frequency transformer and DC/DC converter, both of which reduce the charger's efficiency. A typical efficiency for a well-designed isolated DC/DC converter is in the range of 94-96%, which is comparable to the line frequency transformer, as mentioned above. Thus, while a cost and size benefit can be realized by downsizing the transformer, an efficiency gain cannot. Removing the transformer entirely may provide the opportunity for increased performance in charger size, cost and efficiency.

The complete removal of the transformer has been attempted for both single phase and three-phase inverter circuits interfacing to the grid, particularly for solar applications. However, the issue of leakage currents remains. Standard three-phase grid-tied inverters leave the neutral point of the three-phase capacitor bank isolated (see FIG. 1). The impact of this is that the zero component voltage may fluctuate as a result of the switching action of the three-phase inverter-rectifier. This fluctuation can cause a leakage current to flow from the DC source through the lines and through earth back to the source if a parasitic connection exists. Parasitic connections (or parasitic capacitances) can arise between components of a circuit or system because of their proximity to each other, regardless of if they are electrically connected via the actual circuitry. These stray/parasitic capacitances thus allow for the possibility of stray currents (leakage currents). Leakage currents pose safety hazards for humans and current quality issues when interfacing with the grid. There are also safety standards and requirements that need to be met with regards to leakage currents.

In order to combat leakage current issues, the majority of the aforementioned studies have relied upon significant modifications to the switching circuit, mandating the addition of transistors, diodes, or a combination thereof to attenuate common mode voltages and the earth currents that are generated through the parasitic coupling of the DC ground and AC neutral. From a cost, complexity and reliability perspective, these additions are not ideal. Furthermore, while the common mode voltage and earth currents may have been attenuated in those attempts, the currents were not eliminated. If the common mode component can be held to a fixed value, then the earth currents could be removed entirely, as they are linked to the rate of change of the common mode voltage.

Embodiments of this disclosure provide a system for eliminating leakage currents in transformer-less three-phase charging systems for electrified vehicles, as well as a control strategy that may eliminate the common mode issues associated with switched circuits interface with the grid. The present disclosure does not require significant additional hardware costs and therefore may be simple and cost-effective to implement, while reaching a high efficiency. The system may include a connection from the bank of three-phase capacitors to DC ground. This connection may enable an extra stage for controlling the zero sequence (common mode) voltage. The control strategy may determine an appropriate current to drive into the capacitor bank (enabled by the additional connection to the ground of the inverter-rectifier), which may allow the common mode voltage to be controlled (e.g. held as near constant as possible) via a DC offset, which may greatly minimize and near-eliminate leakage currents from parasitic capacitances. The embodiments of the present disclosure may create an arbitrary zero component DC voltage offset with a full EV charger and smart inverter functionality. Note, the embodiments of the present disclosure are not limited to three-phase systems. It is possible to apply the techniques and systems of the present disclosure to systems with higher or lower numbers of phases in parallel; three is used as an example throughout the disclosure because the three-phase grid is a common implementation. Other applicable systems may include multiple phases that form a system with greater than three phases, two phases that form a single phase or split phase system, and multiple phases that form a single phase, split phase, or three-phase system, etc. In some embodiments, the system can include single phase inductors, three-phase inductors, or common-mode chokes on the grid and/or battery side, which can further mitigate undesired harmonics.

FIG. 1 is a non-isolated charging system 100 that may be susceptible to leakage current issues. System 100 may include a typical three-phase inverter-rectifier, or a standard three-phase grid interface. System 100 may include a bank of three AC voltage sources 102a-c, a bank of three capacitors 104a-c, a bank of three inductors 106a-c, an inverter-rectifier 108, a DC ground 110, a DC voltage 112 (herein referred to as $V_{dc}$, and a parasitic capacitance 114 (herein referred to as $C_p$). A three-phase inverter-rectifier, as shown in FIG. 100, may be used to rectify AC voltage sources into a DC voltage source. These systems may be used to link the grid (left side, at AC voltage sources 102) to an electric vehicle to be charged (DC voltage 112 would charge the vehicle). This may be known as a DC fast charger, which transforms the AC voltage from the grid into a DC source that can charge a battery, such as in an electric vehicle.

The leakage current in a non-isolated system with a parasitic capacitance (such as parasitic capacitance 114) $C_p$ between the DC ground 110 and AC neutral can be written as $$i_{leakage} = C_p \frac{dv_{CM}}{dt} \quad (1)$$

where $V_{CM}$ is the common mode voltage. The common mode voltage may be a voltage difference arising across the parasitic capacitance 114 as a result of the switching operations on the AC side. At high frequencies, the common mode voltage can change rapidly. High frequencies are commonly used because it may help to reduce the required size of passive components such as inductors and capacitors. The common mode voltage may be calculated as $$v_{CM} = \frac{1}{3}(v_a + v_b + v_c) \quad (2)$$

where $v_a$, $v_b$, and $v_c$ are the three-phase voltages at the output of the inverter-rectifier 108. In an ideal three-phase system, these voltages may be balanced sinusoids and their sum should come to zero, which would cause the leakage current to be zero. However, in a switched system and in practice, their sum is not zero, as it is the sum of three overlapping square waves of $\pm(0.5*V_{dc})$. Furthermore, the rate of change of the often non-zero $V_{CM}$ is high, driving the leakage current to high values (see FIGS. 2A-2B).

Figure 2A:
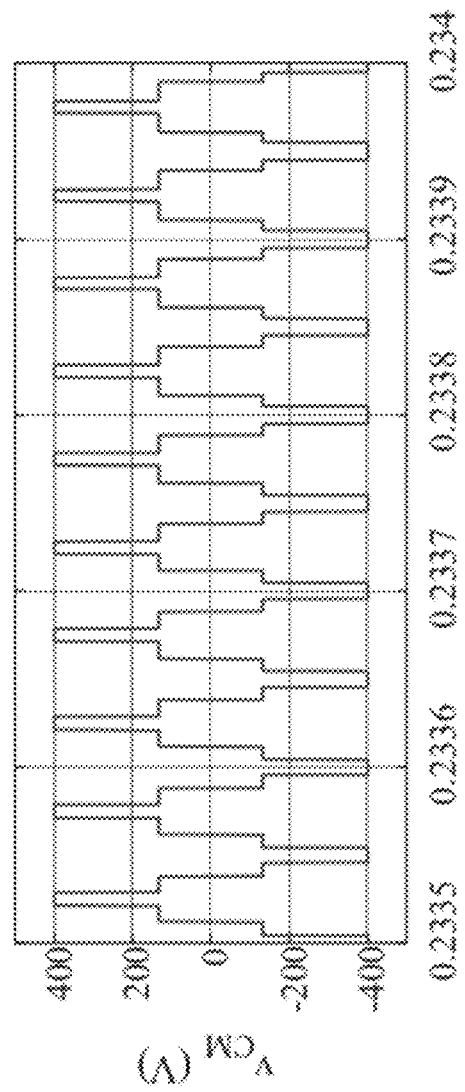
FIG. 2A is a plot of the common mode voltage of a standard non-isolated three-phase grid-tied inverter-rectifier.
Figure 2B:
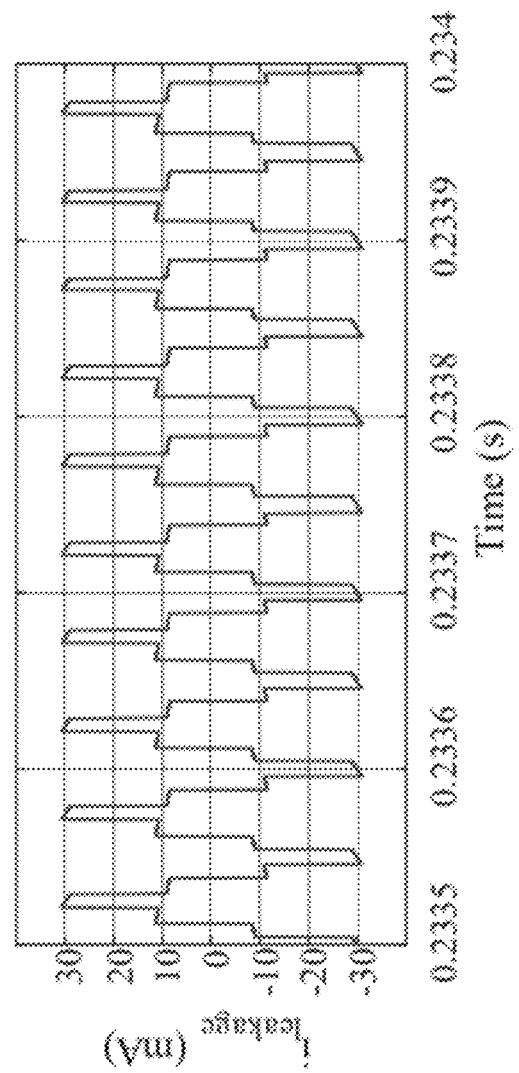
FIG. 2B is a plot of the leakage currents that may result from the common mode voltage fluctuations of FIG. 2A.

FIG. 2A is a plot of the common mode voltage of a standard non-isolated three-phase grid-tied inverter-rectifier. The common mode voltage oscillates between ±400 V, and the rate of change of this plot drives the leakage current. FIG. 2B is a plot of the leakage currents that may result from the common mode voltage fluctuations of FIG. 2A. Oscillations between ±30 mA can pose serious safety risks to human operators and would trigger the residual current device mandated by IEC 62955:2018 and IET Wiring Regulation 18th Edition (BS 7671:2018) Section 722.531.2.101 in EV (electric vehicle) charger stations for human safety.

Figure 3:
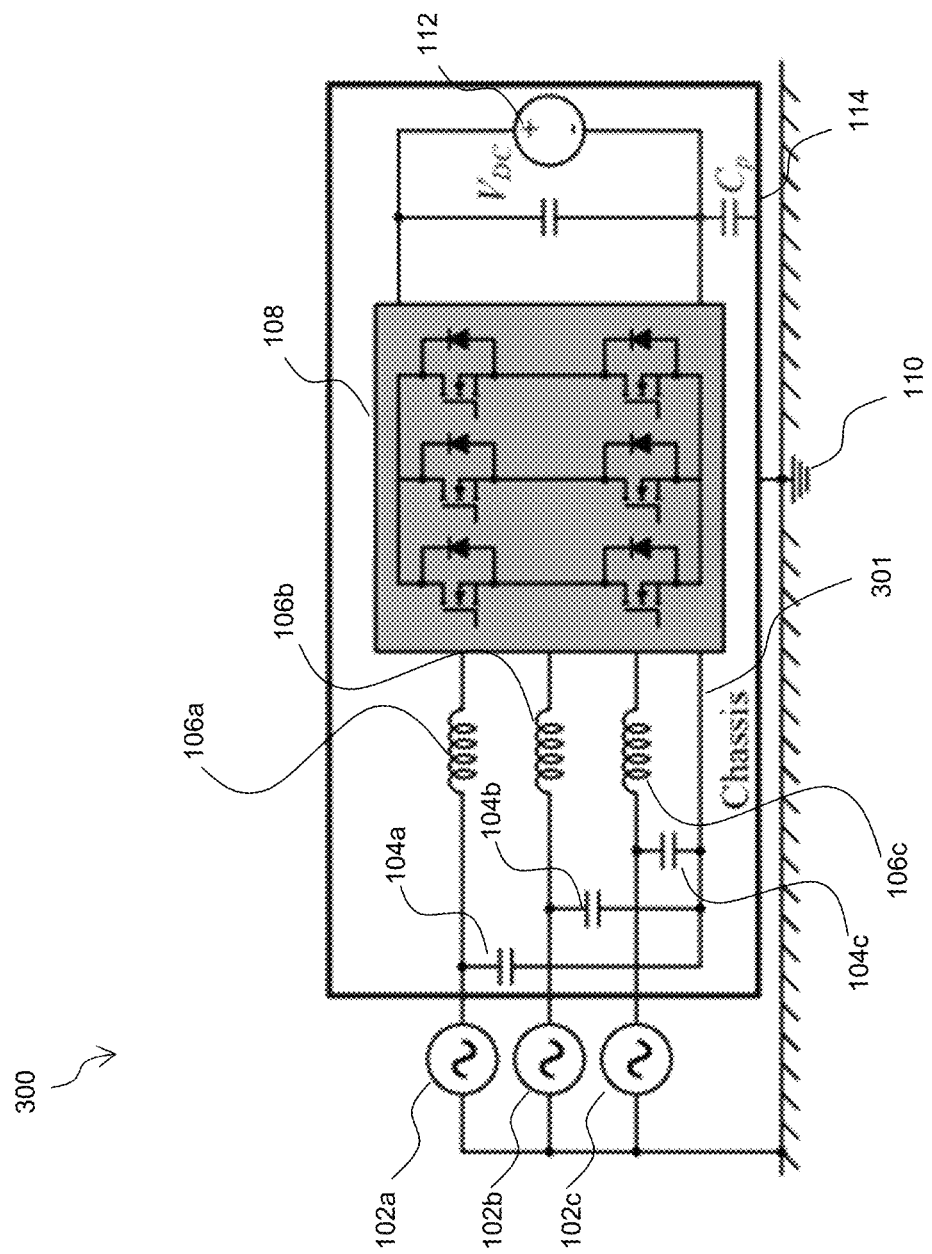
FIG. 3 is a non-isolated charging system with zero sequence voltage control, according to some embodiments of the present disclosure.

FIG. 3 is a non-isolated charging system 300 with zero sequence voltage control, according to some embodiments of the present disclosure. System 300 may include a three-phase inverter-rectifier with ground connection to overcome the leakage current issue, or a three-phase grid interface with ground connection. System 300 may include similar components to system 100 of FIG. 1, such as a bank of three AC voltage sources 102a-b (e.g. the grid), a bank of three capacitors 104a-c, a bank of three inductors 106a-c, an inverter-rectifier 108, a ground 110, a DC voltage 112 (herein referred to as $V_{dc}$, and a parasitic capacitance 114 (herein referred to as $C_p$). In some embodiments, additional filtering components may be inserted into the system (e.g. between the grid/AC voltage sources 102 and the capacitors 104). System 300 also includes a ground connection 301, connecting the neutral point of the capacitors 104 to the ground 110. This additional connection may allow the zero sequence (or common mode voltage, these terms are interchangeable) to be controlled to a fixed value, driving the leakage current toward zero (see FIGS. 4A and 4B).

In order to implement a control strategy to system 300 to control the common mode voltage, the model of system 300 may be transformed into different frames. For ease of modeling, the parasitic capacitance $C_p$ is omitted from the constituent equations governing the behavior of the system 300. The differential equations governing the three-phase system of FIG. 3 (herein referred to as the abc frame) are $$\frac{di_{L,abc}}{dt} = \frac{1}{L}Iv_{,abc} - \frac{1}{L}Iv_{c,abc} \quad (3a)$$

$$\frac{dv_{c,abc}}{dt} = \frac{1}{C}Ii_{L,abc} - \frac{1}{C}Ii_{g,abc} \quad (3b)$$

where L and C are the AC inverter-side inductance and filter capacitance, respectively, which together form an LC filter; $i_{L,abc}$, $v_{c,abc}$, and $i_{g,abc}$ are the three-phase inductor currents, capacitor voltages, and grid currents. In general, g may refer to grid quantities, L may refer to inductor quantities, and C may refer to capacitor quantities. I is the identity matrix, employed for compactness of representation. In some embodiments, because there is no explicit grid-side inductor, the grid voltage at the point of common connection is the capacitor voltage ($v_c=v_g$). Because of the difficulty in controlling sinusoids (i.e. from implementing control via the abc frame), a DC equivalent dq0 frame may be established via coordinate system transformations (see dq0 equivalent circuits in FIGS. 5A-5C).

Figure 4A:
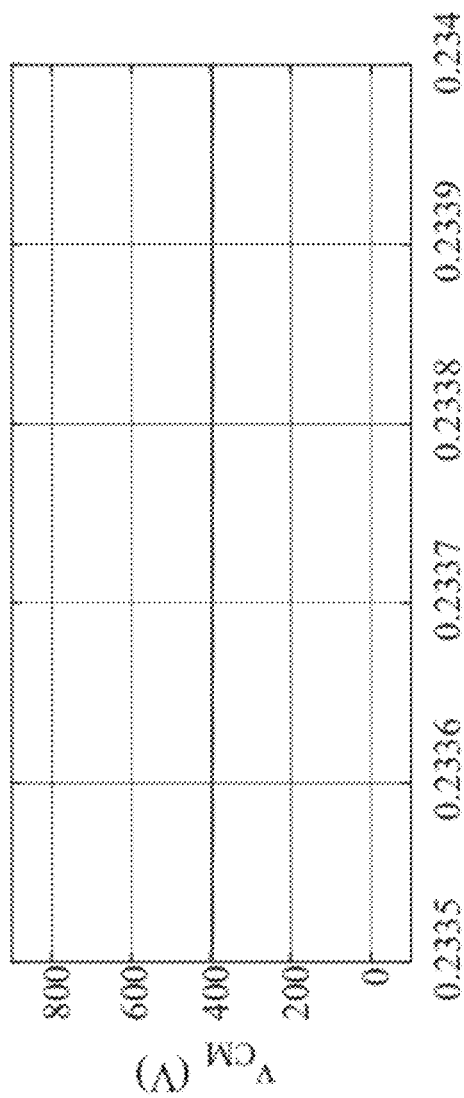
FIG. 4A is a plot of the common mode voltage of the non-isolated charging system of FIG. 3.
Figure 4B:
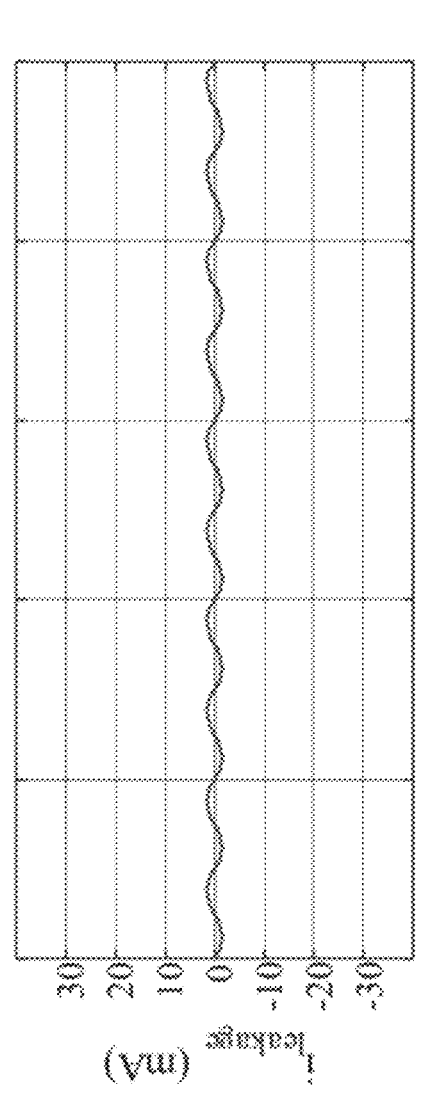
FIG. 4B is a plot of the leakage current of the non-isolated charging system of FIG. 3.

FIG. 4A is a plot of the common mode voltage of the non-isolated charging system of FIG. 3. The common mode voltage oscillates around 400 V but with a very small, almost negligible amplitude. Similar to as described earlier with reference to FIGS. 1 and 2, the rate of change of this plot drives the leakage current. FIG. 4B is a plot of the leakage current of the non-isolated charging system of FIG. 3. These leakage currents may result from the voltage fluctuations in FIG. 4A. The leakage current oscillates around zero volts with an amplitude of around 2-3 mA, well below the leakage current peaks of FIG. 2B and well within the aforementioned standards for human safety.

FIGS. 5A-5C are dq0 equivalent circuits of the system of FIG. 3, according to some embodiments of the present disclosure. As discussed previously, coordinate system transformations can find significant use in the modeling and control of three-phase systems because of the challenges in tracking time-varying sinusoidal quantities. By applying transformations, the three-phase system 300 of FIG. 3 can be converted to an equivalent DC representation that is easier to analyze.

The first transformation, a Clarke transform, may convert the three-phase sinusoidal waveforms to an equivalent orthogonal two-phase representation with a DC component (the zero component). Typically, the zero component is omitted in three-phase systems because the neutral point of the capacitor bank is isolated (such as in system 100 of FIG. 1). However, in the system of the present disclosure, the capacitor neutral is not isolated. Hence, a zero current (note this means the zero component current, not a current of 0 A) can be driven through it, permitting a controllable voltage. The Clarke transform may be performed as follows: $x_{\alpha\beta0}=Tx_{abc}$, where $$T = \begin{bmatrix} 1 & \frac{-1}{2} & \frac{-1}{2} \\ 0 & \frac{\sqrt{3}}{2} & \frac{-\sqrt{3}}{2} \\ \frac{1}{2} & \frac{1}{2} & \frac{1}{2} \end{bmatrix}. \tag{4}$$

Because the system would still be sinusoidal in the α and β components (not the 0 component or zero component), a second transformation, the Park transform, is also employed. The Park transform forces the converted system to rotate at the same rate as the αβ0 frame such that it appears constant. The Park transform may be performed as follows: $x_{dq0}=P(\theta)x_{\alpha\beta0}$, where $$P = \begin{bmatrix} \cos\theta & \sin\theta & 0 \\ -\sin\theta & -\cos\theta & 0 \\ 0 & 0 & 1 \end{bmatrix}. \tag{5}$$

The angle, θ, is the grid's phase, which may be obtained by measuring the voltages at the point of common connection and using a phase-locked loop (PLL); additional details related to the PLL will be described in relation to FIG. 6.

Performing the inverse transformations (e.g. to return to the abc frame from the dq0 frame) is necessary for setting the duty cycles of a typical digital signal processor (DSP) to be used in a physical implementation. Because the Clarke and Park transforms are square, their inverses are simple to obtain. To go from dq0 to abc, $x_{abc}=T^{-1}x_{\alpha\beta0}=T^{-1}P^{-1}(\theta)x_{dq0}$ may be performed.

Applying the aforementioned coordinate system transformations may convert the abc system to its equivalent dq0 system. In doing so, the ability to control the zero sequence that the capacitor's connection to the DC ground may be enabled.

The state-space matrices representing the equations governing the dq0 system, derived from the abc system (3), are $$i_{L,dq0} = \frac{1}{L}Iv_{,dq0} - \frac{1}{L}Iv_{c,dq0} - \omega J i_{L,dq0} \tag{6a}$$

$$\dot{v}_{c,dq0} = \frac{1}{C}Ii_{L,dq0} - \frac{1}{C}Ii_{g,dq0} - \omega J v_{c,dq0} \tag{6b}$$

where ω is the angular velocity of the grid in rad/s and J is a matrix taking into account cross-coupling effects that may result from the transformation process, where $$J = \begin{bmatrix} 0 & -1 & 0 \\ 1 & 0 & 0 \\ 0 & 0 & 0 \end{bmatrix}. \tag{7}$$

Since the control strategy may be enacted in the dq0 frame, it may become useful to take the equations of (6) and represent them in state-space form. The typical state-space model augmented with an exogenous input term is $$\dot{x}(t) = Ax(t) + Bu(t) + Ev(t) \tag{8a}$$

$$y(t) = Cx(t) \tag{8b}$$

where A, B, C, and E may be the state, input, output, and exogenous input matrices, respectively, all of which are define by the system at hand; x(t) may be the state vector and ẋ(t) may be its derivative; u(t) may be the input to the system; v(t) may be the exogenous input; and y(t) may be the system's output. State-space work may generally be conducive to modeling and control.

Because the dq0 system may have a large number of states, it may be useful to use a block matrix representation. The relevant vectors and matrices are given as $$A = \begin{bmatrix} -\omega J & \frac{-1}{L}I \\ \frac{1}{C}I & -\omega J \end{bmatrix}, \tag{9}$$

-continued $$B = \begin{bmatrix} \frac{1}{L}I \\ 0 \end{bmatrix},$$

$$C = \begin{bmatrix} I & 0 \\ 0 & I \end{bmatrix},$$

$$E = \begin{bmatrix} 0 \\ \frac{-1}{C}I \end{bmatrix}$$

$$x = [i_{L,dq0}^T | v_{c,dq0}^T]^T,$$

$$u = [v_{,dq0}],$$

$$v = [i_{g,dq0}]$$

The equivalent circuits for the dq0 system are shown in FIGS. 5A-5C. FIG. 5A may be the d component of the dq0 frame, according to some embodiments of the present disclosure. System 500a may include DC inverter voltage 508 ($v_{in,d}$), inductor 510 (with current $i_{L,d}$), capacitor 504 (with current $i_{c,d}$), grid current 514 ($i_{g,d}$), controlled current source 512 (with current $\omega C v_{g,q}$), controlled voltage source 506 (with voltage $\omega L i_{g,q}$), and DC grid voltage 502 ($v_{g,d}$). Elements 512 and 506 arise from the cross-coupling of the transformations.

FIG. 5B may be the q component of the dq0 frame, according to some embodiments of the present disclosure. System 500b may include DC inverter voltage 524 ($v_{in,q}$), inductor 526 (with current $i_{L,q}$), capacitor 520 (with current $i_{c,q}$), grid current 528 ($i_{g,q}$), controlled current source 518 (with current $\omega C v_{g,d}$), controlled voltage source 522 (with voltage $\omega L i_{g,d}$), and DC grid voltage 516 ($v_{g,q}$). Elements 518 and 522 arise from the cross-coupling of the transformations. The variables beside the controlled sources (506, 512, 518, and 522) may represent how much voltage/current is injected. So, for controlled current source 518, current may be provided in the direction specified by the arrow of value $\omega C v_{g,d}$. The same idea may apply for 522, 506 and 512. As mentioned before, these components come from cross-coupling between the d- and q-axes resulting from the Park transform.

FIG. 5C may be the 0 component (zero sequence or zero component as previously referred to) of the dq0 frame, according to some embodiments of the present disclosure. System 500c may include DC inverter voltage 534 ($v_{in,0}$), inductor 536 (with current $i_{L,0}$), capacitor 532 (with current $i_{c,0}$ and voltage $v_{c,0}$), parasitic capacitance 530 ($C_P$), and leakage current 538 ($i_{leakage}$). The fluctuation of the voltage (zero sequence or common mode voltage) across the parasitic capacitance 530 and the capacitance of the capacitor 532 (they are the same) drives the leakage current 538. If the common mode voltage can be held constant, the leakage current 538 may be driven to zero. The common mode voltage can be held constant by controlling the current through inductor 536 which in turn can be controlled by driving the DC inverter voltage 534. A control strategy may be depicted in FIG. 6.

Figure 6:
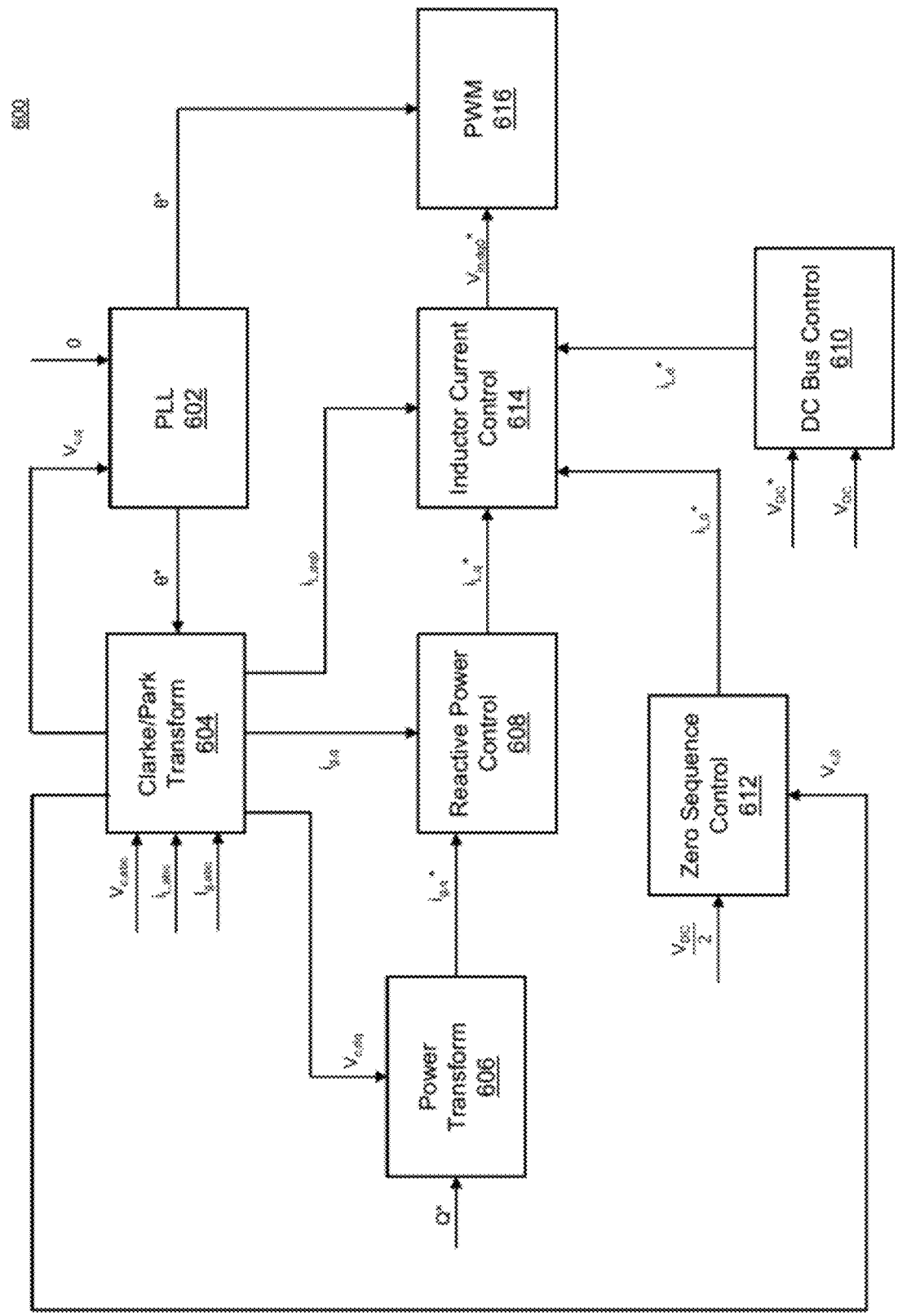
FIG. 6 is a control block diagram for a non-isolated charging system, according to some embodiments of the present disclosure.

FIG. 6 is a control block diagram 600 for a non-isolated charging system, according to some embodiments of the present disclosure. System 600 may be a control strategy for use in conjunction with the system 300 of FIG. 3. System 600 may allow for the control of the zero sequence voltage component (common mode voltage) and thus the mitigation of leakage currents. In some embodiments, system 600 may be implemented with a proportional-integral (PI) controller. However, model predictive control (MPC) or other advanced control methods may also be utilized. System 600 may include a phase-locked loop (PLL) block 602, a Clarke/Park transform block 604, a power transform block 606, a reactive power control block 608, a DC bus control block 610, a zero sequence control block 612, an inductor current control block 614, and a pulse width modulation (PWM) block 616.

PLL block 602 may be configured to determine the phase of the grid (θ). The PLL block 602 receives measurements of the three-phase voltages at the point of common connection and infers θ. PLL block 602 may drive $v_{c,q}$ (received from the transform block 604) to 0 in order to determine the phase grid. This suggests that the d-axis may dictate active power (the real power dissipated in the circuit) and the q-axis may dictate reactive power. Reactive power may refer to power flow due to the delay between voltage and current (phase angle) in an AC circuit; reactive power cannot perform any useful work. The output of the PLL block 602 is the grid phase (θ*), which may be fed as an input to the PWM block 616 and the transform block 604.

Transform block 604 may be configured to perform a Clarke and Park transform on the input abc frame three-phase voltage ($v_{c,abc}$) and current signals ($i_{L,abc}$ and $i_{g,abc}$), such as discussed in relation to FIGS. 5A-5C. Transform block 604 may also receive the grid phase (θ*) determined by the PLL block 602. In some embodiments, transform block 604 may use these inputs to perform the transformation and determine voltage and current outputs in the dq0 frame. The outputs of the transform block 604 may be the 0 component of the capacitor voltage $v_{c,0}$ (see capacitor 532 of 500c), which is sent as an input to zero sequence control block 612; the dq components of the capacitor voltage $v_{c,dq}$ (see capacitors 504 and 520 of FIGS. 500A-B), which is sent as an input to power transform block 606; the q component of the grid current $i_{g,q}$ (see current 528 of FIG. 500B), which is sent as an input to reactive power control block 608; and the dq0 components of the inductor current (see inductors 510, 526, and 536 of FIGS. 500A-C) $i_{L,dq0}$, which is sent as an input to the inductor current control block 614.

Power transform block 606 may be configured to receive the dq components of the capacitor voltage $v_{c,dq}$ from transform block 604 and a desired reactive power Q* as inputs. Power transform block 606 may be configured to use impedance matching to determine an appropriate current level to generate the desired reactive power given the input voltage. Power transform block 606 may determine the desired q component of the grid current $i_{g,q}$* (see current 528 of FIG. 500B) and feed it as an input to reactive power control block 608.

Reactive power control block 608 may be configured to absorb or provide reactive current at the point of common connection with the grid to help control the line voltage. The voltage may be lowered (absorb) or raised (provide). Reactive power control block 608 may be configured to receive the desired q component of the grid current $i_{g,q}$* from power transform block 606 and the actual q component of the grid current $i_{g,q}$ from the transform block 604. Reactive power control block 608 may be configured to determine (and provide) a current to provide a desired q component of the inductor current $i_{L,q}$* (see inductor 526 of FIG. 500B) as an input to inductor current control block 614.

DC bus control block 610 may be configured to hold the DC-link voltage constant about a desired setpoint, which may be determined primarily by the grid voltage to be interfaced with. Insufficient DC-link voltage may render the system incapable of providing current to the grid. As the battery (of the electric vehicle) charges and discharges, energy is taken from and provided to the DC-link, which may cause the voltage to fall and rise, respectively. Because DC power is active (not reactive), the direct output of the DC bus control block 610 is the active power of the system P (not shown in any figures). In some embodiments, DC bus control block 610 may be configured to use a lumped transfer function that directly gives a current output based on the power P output. DC bus control block 610 may be configured to receive a desired DC voltage $V_{DC}^*$ and the actual DC voltage $V_{DC}$ as inputs (see FIG. 3). DC bus control block 610 may be configured to keep $V_{DC}$ as close/stable as possible to $V_{DC}^*$; as a result DC bus control block 610 may determine a desired d component of the inductor current $i_{L,d}^*$ (see inductor 510 of FIG. 500A).

Zero sequence control block 612 may be configured to receive the 0 component of the capacitor voltage $v_{c,0}$ (see capacitor 532 of 500c) and a desired voltage level ($0.5^*V_{DC}$) as inputs. Zero sequence control block 612 may be configured to control the capacitor voltage $v_{c,0}$ (e.g. drive the capacitor voltage to a value of $0.5^*V_{DC}$) by driving the 0 component of the inductor $i_{L,0}^*$ to a specific value (see inductor 536 and capacitor 532 of FIG. 500c). In other words, zero sequence control block 612 may determine the 0 component of the inductor current that drives the 0 component of the capacitor voltage to $0.5^*V_{DC}$. Note the 0 component of the capacitor current is equal to the 0 component of the inductor current when $C_P$ is approximated as being zero. In some embodiments, zero sequence control block 612 may use a transfer function created by taking the Laplace transform of the 0 component of equation (8) and performing some algebraic manipulations:

$$H(s) = \frac{v_{c,0}}{i_{L,0}} x \frac{i_{L,0}}{v_{,0}} = \frac{v_{c,0}}{v_{,0}}. \quad (10)$$

Of note is the selection of the zero sequence voltage set-point. Setting the desired value to $0.5^*V_{DC}$ may help maximize the utilizable DC-link voltage, as the AC system switches between zero and $V_{DC}$. This may be similar to how a standard inverter is centered around 0V and switches between $\pm(0.5^*V_{DC})$. In some embodiments, the desired value may also be a periodic waveform with an average of $0.5^*V_{DC}$.

Inductor current control block 614 may be configured to limit the current provided by the inverter (current provided is determined according to previously described blocks) to protect the switching devices. Inductor current control block 614 may be configured to receive the desired d component of the inductor current $i_{L,d}^*$ from DC bus control block 610, the desired q component of the inductor current $i_{L,q}^*$ from reactive power control block 608, and the desired 0 component of the inductor current $i_{L,0}^*$ from zero sequence control block 612 as inputs. Note this constitutes the full three-phase inductor current vector in the dq0 frame. Inductor current control block 64 may also receive the actual/measured full-three phase inductor current vector $i_{L,dq0}$ from the transform block 604. Inductor current control block 614 may be configured to determine the desired voltage of the inverter $v_{in,dq0}^*$ that would drive the measured inductor current to the desired inductor current values (see inverter voltages 508, 524, 534 of FIGS. 500A-C). The desired voltage of the inverter $v_{in,dq0}^*$ may then be output to the PWM block 616. PWM block 616 may be configured to turn switches on and off. With PWM, the width of the pulse applied to the switch may be adjusted while maintaining the same switching frequency. After the desired voltage of the inverter $v_{in,dq0}^*$ is determined, the signal may be transformed (e.g. inverse transformed, as described earlier in this application) back to the abc frame in order to determine the real-world signal to be produced that may offset the DC voltage and mitigate the leakage current. The inductor current controller may generate a $v_{in,dq0}^*$ that is capable of driving the desired $i_{L,dq0}$. The reverse transforms turn $v_{in,dq0}^*$ into $v_{in,abc}^*$, which may then be turned into a pulse width that is applied to the switches on a per-phase basis.

FIGS. 7A and 7B are experimental validations of the non-isolated charging system of FIG. 3. FIG. 7A may show the capacitor voltage (top) and leakage current (bottom) with an increasing zero sequence voltage. FIG. 7B may show the capacitor voltage (top) and leakage current (bottom) with a decreasing zero sequence voltage. The capacitor voltage may also be referred to as the three-phase voltages and the leakage currents may also be referred to as the three-phase currents. In FIGS. 7A-B, the zero sequence voltage is being changed from $300V_{DC}$ to $250V_{DC}$ (7A) and $300V_{DC}$ to $350V_{DC}$ (7B). FIGS. 7A and 7B may demonstrate that the zero sequence voltage can be changed arbitrarily to some specified value with the leakage current in control.

Figure 8:
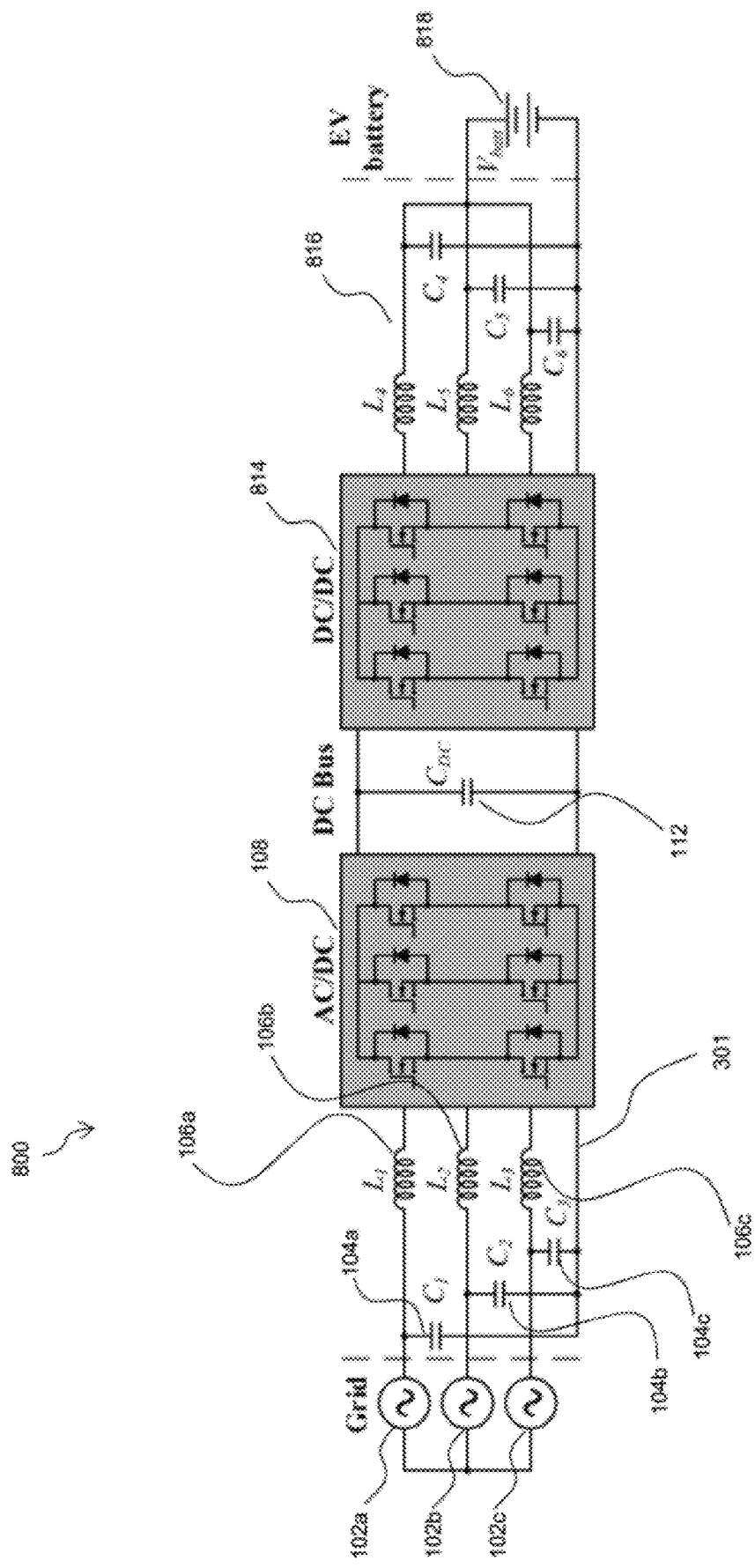
FIG. 8 is a system overview of a non-isolated charging system, according to some embodiments of the present disclosure.

FIG. 8 is a system 800 of a non-isolated charging system, according to some embodiments of the present disclosure. System 800 may include all of the components of system 300 (left side of system 900), including DC bus 112. In some embodiments, system 800 may also include a DC/DC converter 814 (buck converter), a circuit 816 (including a bank of three inductors and three capacitors), and an EV battery 818. System 800 may be an application of the present disclosure and may illustrate the charging scheme for an electric vehicle battery. In some embodiments, the LC bank (left side of system 900, e.g. the inductors and capacitors of system 300) may be designed such that the harmonics induced from switching can be managed below the total harmonic distortion (THD) specified by the regulations for grid-tied converters. The LC bank on the right side (circuit 816) may filter out ripples on the battery voltage and current to a reasonable range where the battery may not be harmed or degraded. In some embodiments, the LCL filter (inductors and capacitors on the AC side, system 300) may serve as approximations of grid-side inductance and, in practice, the inductance of the grid may be leveraged, which may assist with the filtering process.

Figure 9:
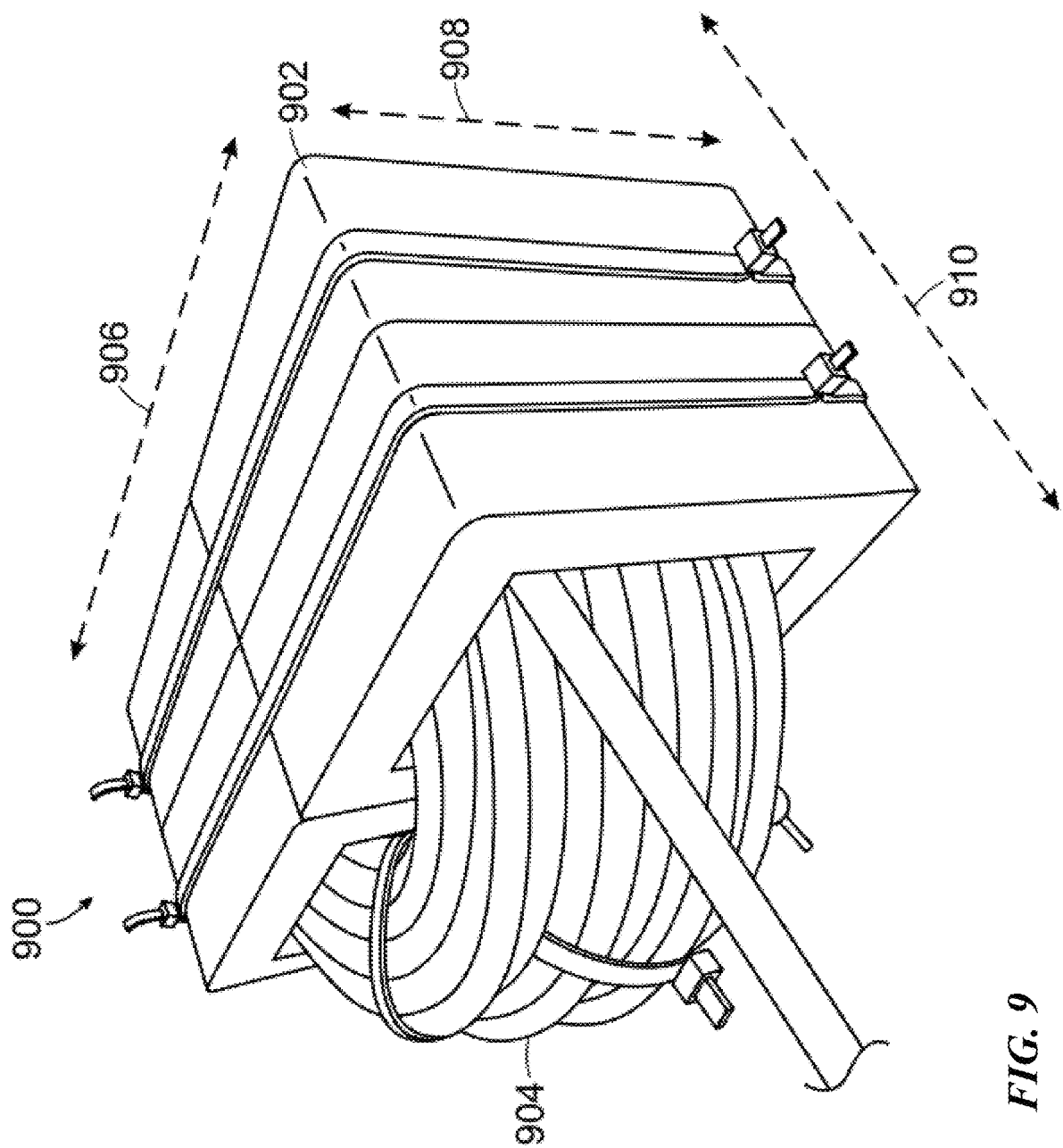
FIG. 9 is an example inductor used in a non-isolated charging system, according to some embodiments of the present disclosure.

FIG. 9 is an example inductor 900 used in a non-isolated charging system 300, according to some embodiments of the present disclosure. In some embodiments, inductor setup 900 may be a high-efficiency, planar, e-core inductor and may include three inductors 902 made of a high frequency ferrite material (e.g. Kool Mµ material from Magnetics), turns 904 made of Litz wire (e.g. 30-60 turns), and may have dimensions 13 cm (906) by 6.5 cm (908) by 12 cm (910). In many designs for inverters and charging stations, inductors often contribute to most of the losses of the converters. In some embodiments, inductors, such as inductor 900, may be optimized based on power losses. Typical methodologies for optimizing inductor designs include Fuzzy Logic Control and seek to optimize core size, filling factor, and cost. However, power loss may be a more apt parameter to design with. Many methodologies assume that power loss is equally distributed in core and copper and the minimum power loss can be found. In practice, this point may not necessarily exist because of the constraints on allowable numbers of turns and core material. Therefore, an iterative calculation for copper and core loss may be thoroughly conducted and the optimum design parameter may be found. The inductor 900 may yield efficiencies of 99.5% in a buck converter and non-isolated charging platforms interfacing the U.S. grids, such as the system of the present disclosure.

Figure 14:
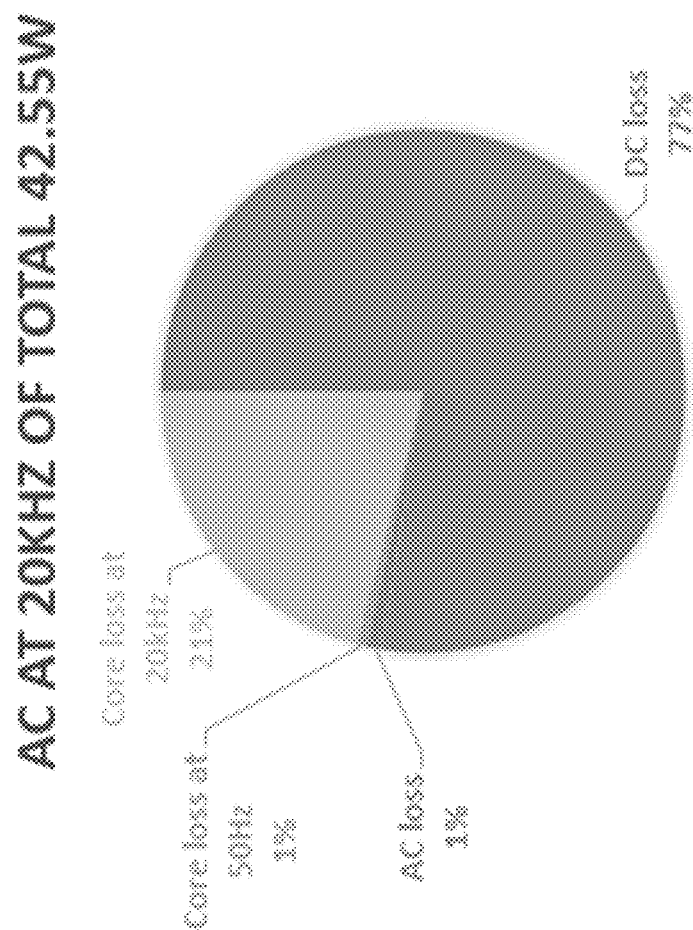
FIG. 14 shows the loss distribution of an inductor, according to some embodiments of the present disclosure.

For the inductors of the present disclosure, a low or no air gap may be chosen. However, the concatenated current combined can create high magnetic fields that saturate a magnetic and cause severe power losses especially at higher frequencies. Due to the low permeability of the core made from a ferrous alloy powder, the inductors can be designed with no intentional air gap except for the intrinsic air gap provided by the property of the selected core (many small air gaps that isolate the grains of the core). The loss distribution of the designed inductor is shown in FIG. 14, which shows particularly low AC losses.

Losses of an inductor may originate from copper loss and core loss. Core loss can be minimized by reducing the current ripple and better core material, which will be elaborated on in the next few paragraphs. On the other hand, copper loss is typically dominated by the winding design. Resistance is inverse proportional to the cross area of the winding conductor. The conductor is normally chosen to be thicker when more current is needed to conduct while keeping the conductor cool. It may be valid if the current carried by the conductor is direct-current (DC) or is a low-frequency AC current. Due to Eddy currents, the conducting current starts to concentrate more towards the surface as the center current may be canceled out by the induced eddy current, which may lead to the decrease of the utilization of the conductor and induce a higher resistance for AC applications. In some embodiments, a factor called skin depth may help reduce and avoid inconsistently distributed current when designing inductors.

Litz wire may be used to conduct high current (stranded wire) and may protect and reduce AC copper losses. Litz wire may be a special type of multi-strand wire or cable for electronics that carries AC current at high frequencies. The wire may be designed to reduce the skin effect and proximity effect losses in conductors used at frequencies up to around 1 MHz. A thinner cable may reduce the skin effect. However, the thinner the cable is, the less extra resistance will be introduced at high frequency due to the skin effect. Thus, a balance may be struck for optimal performance.

In the arrangement of Litz wire, the diameter of the wire may determine how many turns can be installed in the core, which may further limit the maximum inductance. On the other hand, the current carrying capability may be constrained by the effective diameter of the wire. One may need to make a tradeoff between inductance and continuous current carrying capability unless a larger core is chosen with compromise of higher core losses.

For determining the size of the core, an area product (AP) method may be adopted to filter out the sizes that are not sufficient for a given power handling capability. The AP method may correlate the electrical power requirement with the core geometrical power handling capability to help define whether the size of a core can satisfy the power requirement of the inductor. If the geometric AP (a function of the effective cross section area of the core and window area of the core) is larger than the electrical AP (related to circuit parameters such as inductance, peak current, peak flux density swing, RMS current density, and window utilization factor), then the size may be acceptable. If not, the core may be too small for the required power and a larger core may be needed or a paralleled core may be needed.

The inductance of an inductor may be determined by the geometry of the core, number of turns, and the air gap. Once a core is selected, the two parameters that can be manipulated to achieve the target inductance are the number of turns and the air gap. When the air gap is sufficiently large, the material properties may not govern the inductance. Instead, the air gap may dominate the determination of the inductance. This may leave inductor designers flexibility to choose the inductance according to their own requirements and specifications. On the other hand, too large of an air gap may eventually cause extra loss to fringing effects. The net effect of fringing effects is decreasing the total reluctance of the magnetic path, which may cause the final inductance to be less than intended. In some embodiments, fringing effects, in addition to power losses, may be used to design an inductor. The air gap size may counteract on the inductance while increasing the number of turns may result in a higher inductance. The larger the air gap is, the lower the dependence on intrinsic properties has the core inductance. On the other hand, the number of turns and core losses are nonlinearly correlated based on the empirical Steinmetz's equation.

Copper loss may be dependent on the length and width of the windings. Therefore, more turns may lead to higher copper loss for a given width. The mean length per turn may be used to calculate the total length of the windings by multiplying the number of turns. It is not straightforward to design the number of turns and air gap for minimum power losses due to the nonlinearity and dependence of each loss. Thus, optimizing an inductor to minimize power loss based on core size, core material, number of turns, and air gaps is time-consuming and not straightforward.

In some embodiments, when designing the inductor, a saturation check may be performed. The saturation check may determine whether the maximum flux density point is within the B-H saturation boundary of the given material. The peak flux density swing (Bpk) is the maximum value without saturating the core. If it exceeds the B-H saturation boundary, then the design is discarded.

Figure 10:
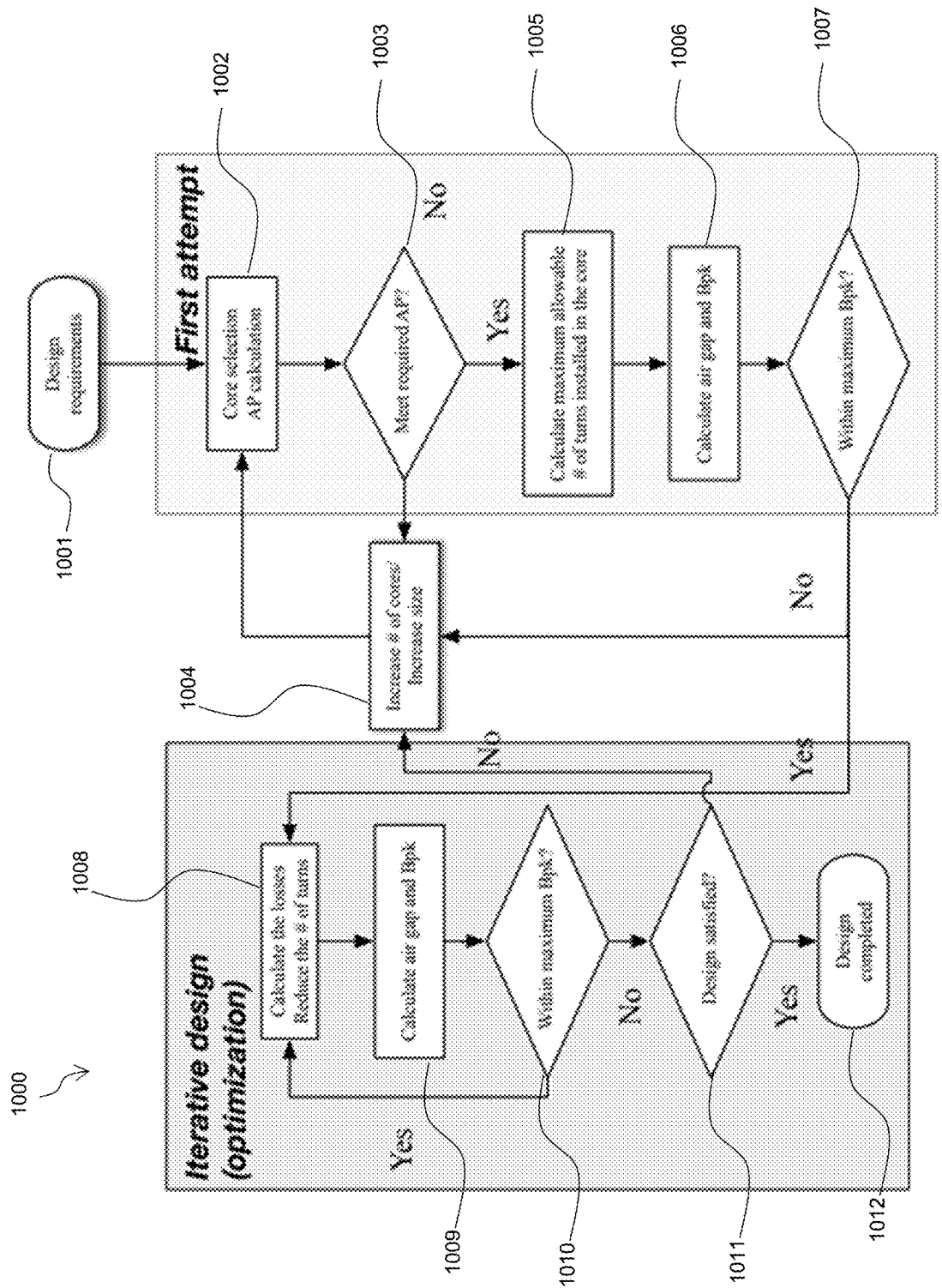
FIG. 10 is a process for designing an inductor, according to some embodiments of the present disclosure.

FIG. 10 is a process 1000 for designing an inductor, according to the present disclosure. In some embodiments, inductor 900 may have been designed via process 1000. In some embodiments, finite element simulation may be used for various blocks in process 1000. At block 1001, the design requirements may be determined based on the desired application (e.g. inductors may be needed for a non-isolated charging system). Note, this process may apply to inductor design for other applications, as well, only different requirements would be determined at block 1001. Example inductor materials are shown in Table 1.

TABLE 1

| Manufacturer | Magnetics | Ferroxcube | TDK |
| --- | --- | --- | --- |
| Core Material | Kool Mµ | 3C92 | PE90 |
| Operating Frequency | ≤500 kHz | ≤200 kHz | ≤1 MHz |
| Dimensions | EE130x32.5x53.8 | EE100x60x28 | EE90x56x16 |
| Initial Permeability | 26 $\mu_0$ | 1500 $\mu_0$ | 2200 $\mu_0$ |
| $B_{sat}$ [T] @ 25° C. | .9 | .4 | .53 |
| $A_L$ [nH/T$^2$] | 254 | N/A | N/A |
| Available $A_P$ [mm$^4$] | 211.1 | 157.83 | 25.47 |
| Required $A_P$ [mm$^4$] | 96.81 | 217.83 | 202.6 |

At block 1002, based on the selected design requirements, a core material selection is selected and an AP calculation may be performed. At block 1003, the AP calculation may be analyzed; if the required AP is not met, then the design flow may proceed to block 1004. At block 1004, the number of cores and/or size of the core may be increased, and the design process returns to block 1002 with the new sizing and/or amount. If the required AP is met, then the design flow may proceed to block 1005. At block 1005, the maximum allowable number of turns installed in the core may be calculated. At block 1006, the air gap and Bpk (peak flux density swing) may be calculated. At block 1007, the Bpk calculated at block 1006 may be analyzed: if the Bpk is not within the maximum, the design flow returns to block 1004 to increase the size and/or number of cores. If the Bpk is within the maximum, design may proceed to block 1008. At block 1008, the losses may be calculated. Once the power losses are calculated, the number of turns may be reduced a certain amount (reducing the number of turns may reduce power loss). At block 1009, the air gap and Bpk may be calculated for the inductor with the reduced amount of turns. At block 1010, the Bpk may be analyzed again: if the Bpk is within the maximum Bpk, the design flow returns to block 1008. If the Bpk is not within the maximum Bpk, design flow proceeds to block 1011. If the design is not satisfied, the design flow returns to block 1004 to restart the design. If the design is satisfied, flow may proceed to block 1012 where the design is considered complete. Blocks 1008-1012 may be an iterative design process and may be used to minimize the power loss and number of turns while still maintaining satisfactory operation.

Simulation of design candidates are conducted in finite element analysis software with configurations of 44 turns and 52 turns that are calculated from the AL factor and the design process 1000 for Litz wire with a Kool Mµ core. Final simulated inductances at 20 kHz were 416 uH and 499 uH, respectively. In addition to obtaining more accurate inductance estimation, finite element analysis may help define the current and loss distributions using different solvers. DC excitation solvers may help see the core saturation and copper loss and AC excitation at line frequency solvers may help evaluate core saturation at extreme cases. The AC excitation solver may also help obtain the core loss at switching frequency, which may outweigh the core loss at line frequency.

Figure 11:
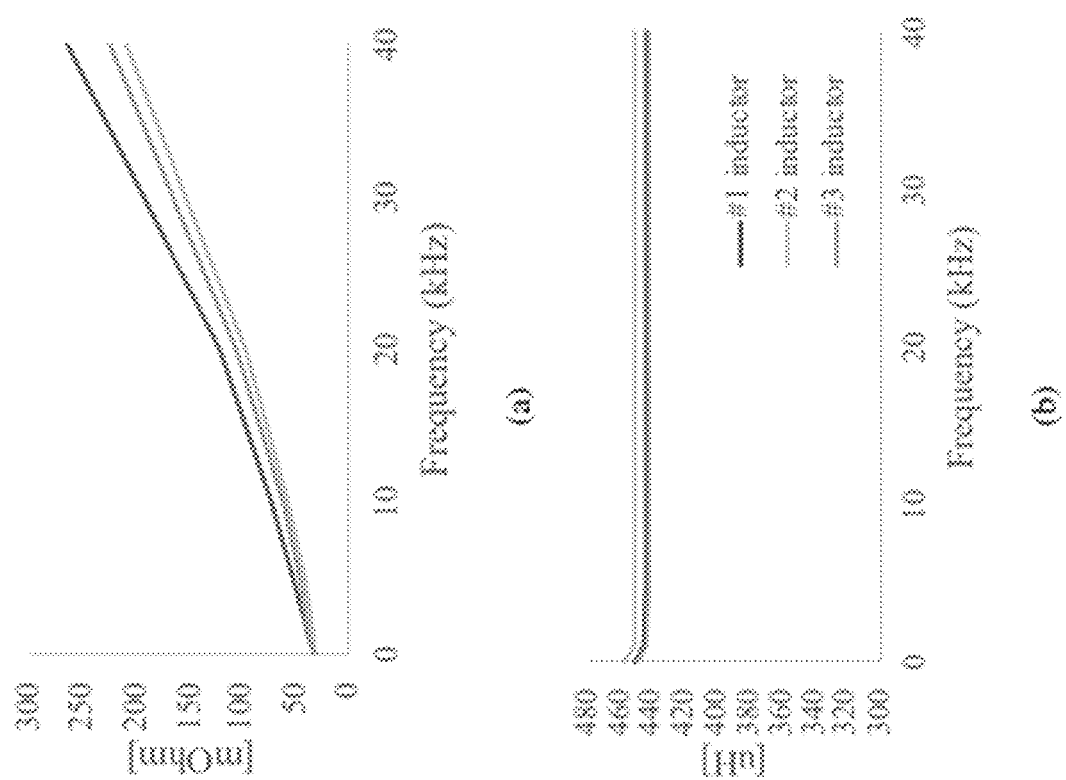
FIG. 11 shows experimental results for total resistance and inductance varying with frequency of the inductor setup of FIG. 9, according to some embodiments of the present disclosure.

The Litz wire may provide less copper loss and thus higher overall efficiency than PCB. In some embodiments, a commercially available Litz wire from Cooner Wire may be used due to its high voltage ratings and equivalent wire gauge for conducting high current. FIG. 11 shows experimental results for total resistance and inductance varying with frequency of the inductor setup of FIG. 9. A precision RLC meter in a laboratory environment was used to characterize the inductor. The RLC meter measures the inductance without DC bias. The resistance shows a trend of increasing monotonically with frequency. The inductor setup (all three inductors) has a consistent 1% variation in inductance and 10% variation in resistance.

Figure 12:
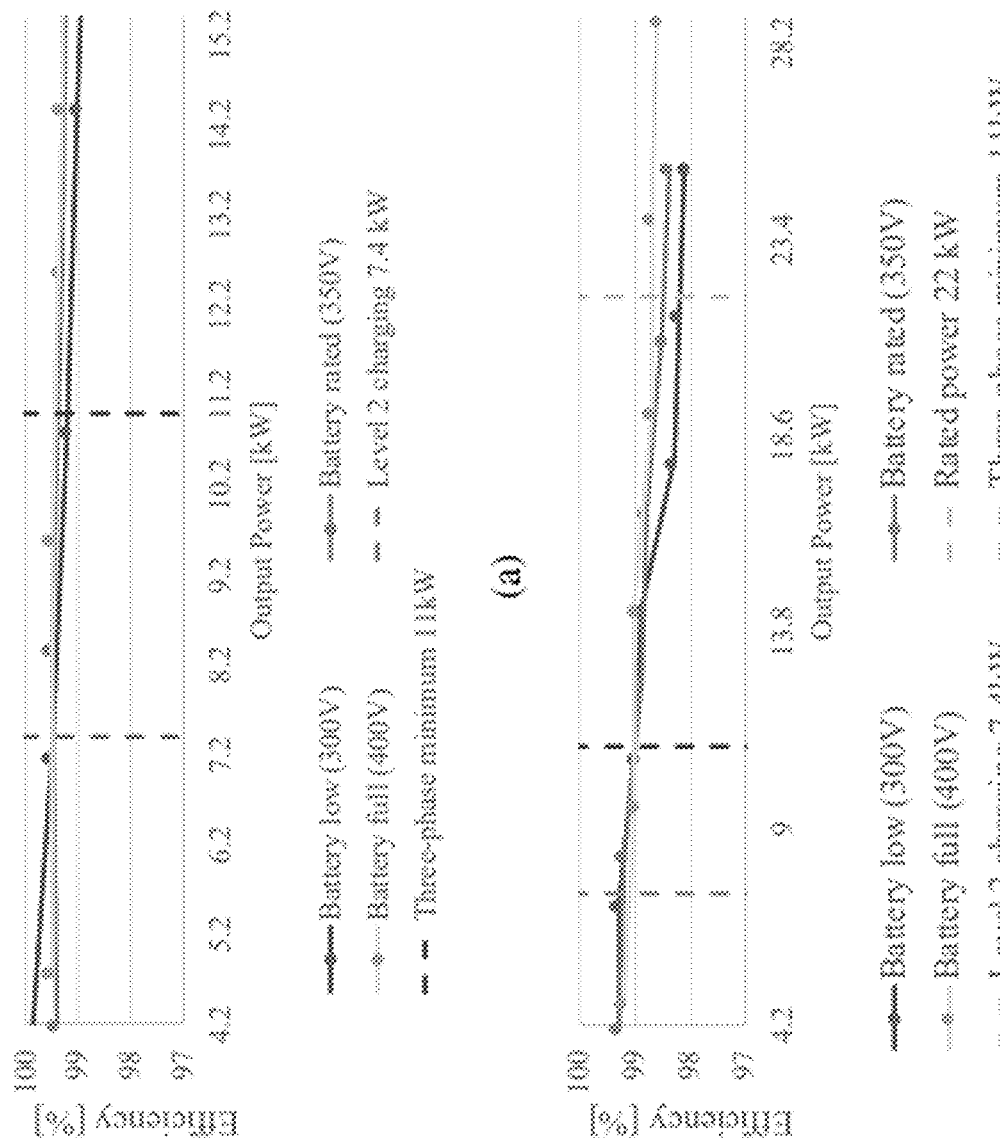
FIG. 12 is an efficiency map that is projected to the entire system of FIG. 8 obtained at voltage levels from different countries' standards, according to some embodiments of the present disclosure.
Figure 13:
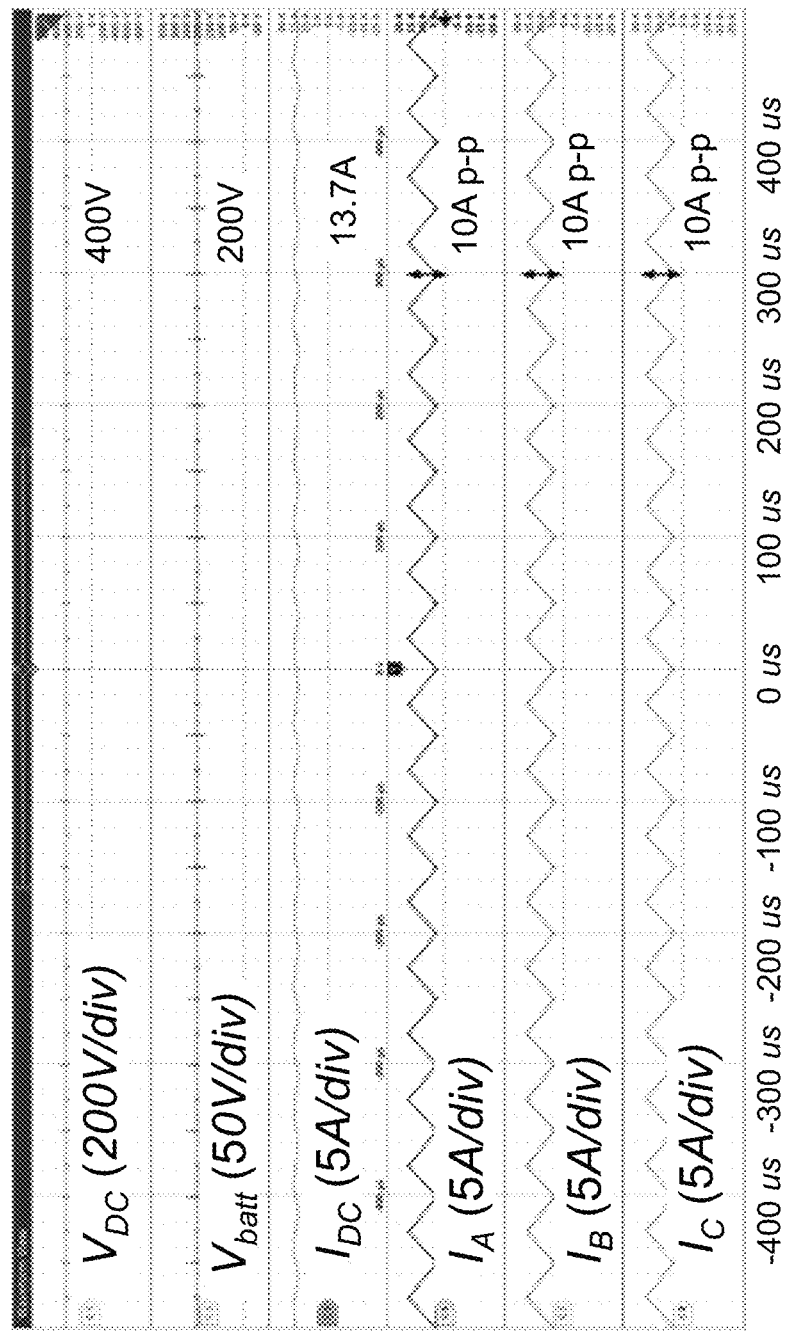
FIG. 13 shows the basic operation waveforms of the inductor design of FIG. 8, according to some embodiments of the present disclosure.

In order to obtain experimental measurements on efficiency, the assembled inductors may be installed on the buck converter (circuit 816 of FIG. 8) developed to validate non-isolated charging systems of the present disclosure. FIG. 12 is an efficiency map that is projected to the entire system of FIG. 8 obtained at voltage levels from different countries' standards. FIG. 12A is an efficiency map for the U.S. grid single-phase 240 V. FIG. 12B is an efficiency map for the EU/CN grid three-phase at 400 V. The validation may assume fully symmetrical operation for AC/DC and DC/DC stages. The peak efficiency is 99.5% at 4.2 kW with U.S. grid and lower battery voltage (300 V). The average efficiencies within the entire operating range for the U.S. grid and the EU/CN grid are 99.3% and 98.81%, respectively. FIG. 13 shows the basic operation waveforms of the inductor design. The voltage conversion is from 400 V to 200 V at an output power of 2.74 KW. The current waveforms of the three inductors show high linearity and the desired filtering capability.

Figure 15A:
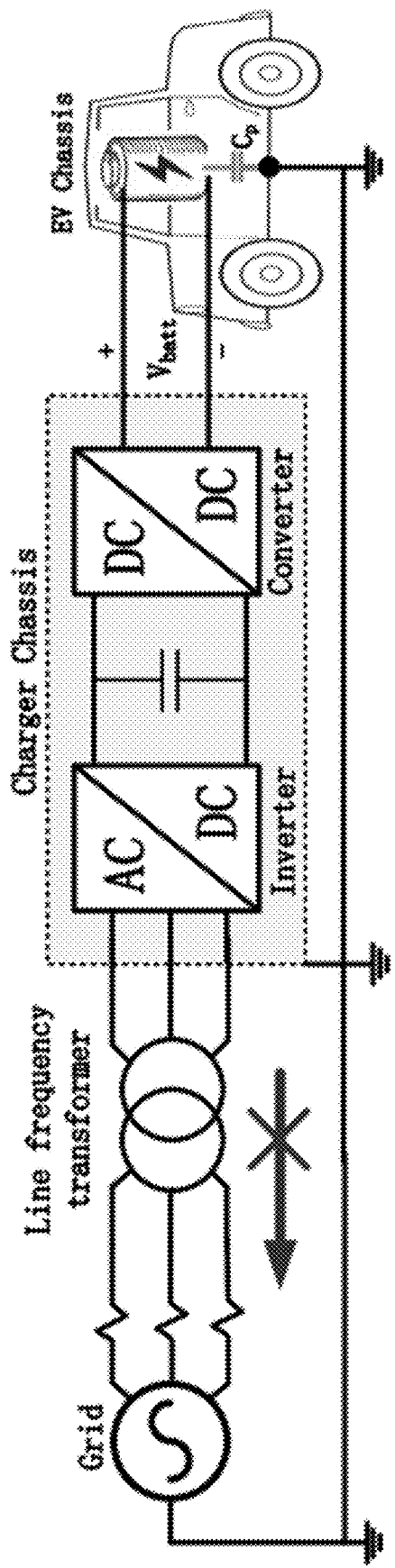
FIG. 15A shows an electric vehicle charging system with a line frequency transformer.
Figure 15B:
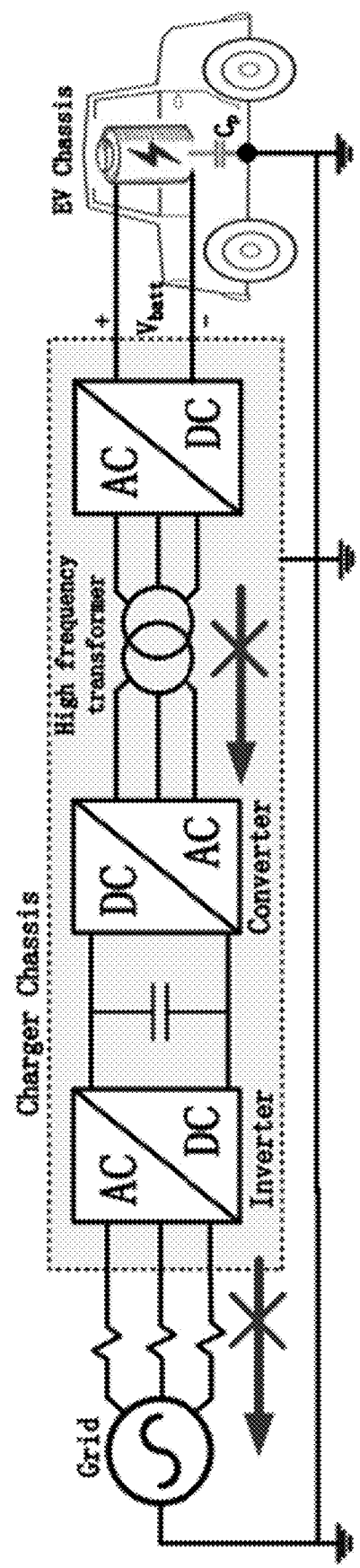
FIG. 15B shows an electric vehicle charging system with a high frequency transformer.

FIG. 15A shows an electric vehicle charging system with a line frequency transformer. FIG. 15B shows an electric vehicle charging system with a high frequency transformer. As described earlier, using transformers has been an attempted method of mitigating leakage currents in charging stations. In FIG. 15A, the line frequency transformer (50/60 kHz) is installed between the grid and the AC/DC rectifier. In FIG. 15B, the high frequency transformer is installed among the DC/DC power stage that operates at the switching frequency (e.g. 20 kHz). However, transformers can have serious issues when it comes to cost, size, and weight. For example, a line frequency transformer of 30 kVA and 60 Hz can cost more than $2,000 and weigh more than 100 kg (~220 lbs). The transformer can also induce extra power losses, decreasing the overall charging efficiency of the system. According to some embodiments of the present disclosure, a non-isolated charging system that can mitigate leakage currents without the use of a transformer has been described. In addition, embodiments of the present disclosure may relate to a converter (and thus a general DC fast charging system) that can operate in conjunction with the proposed additions to the AC side of the charger. The DC side of the charging system (herein referred to as the converter) may be formed via basic power modules and may be symmetric with the AC side of the system (e.g. system 300). This may reduce development and manufacturing costs of the charging system (e.g. the rectifier and the converter). The converters can be designed to meet both the grid and battery side requirements. In some embodiments, the converters may be composed of two-level phase legs and LC filters (described in relation to FIG. 16). The AC/DC rectifier and DC/DC converters can share the same DC bus voltage. The charger of the present disclosure may be designed to meet both International (IEC) and US (IEEE, NEMA) standards.

Possible configuration options for selecting parameters are shown in FIG. 16. For the IEC standard, the grid voltage is 240 V or 400 V with a line frequency of 50 Hz. In some embodiments, because the standard grid voltages are RMS values, the DC bus voltage a value such that it can support the amplitude of the sinusoidal grid voltages. In some embodiments, a factor of √2 may be taken into consideration when determining the DC bus voltage value. In some embodiments, a third harmonic can be superimposed on the grid voltage to increase the maximum voltage amplitude. In some embodiments, the minimum DC bus voltage may be 390 V or 650 V.

Figure 17:
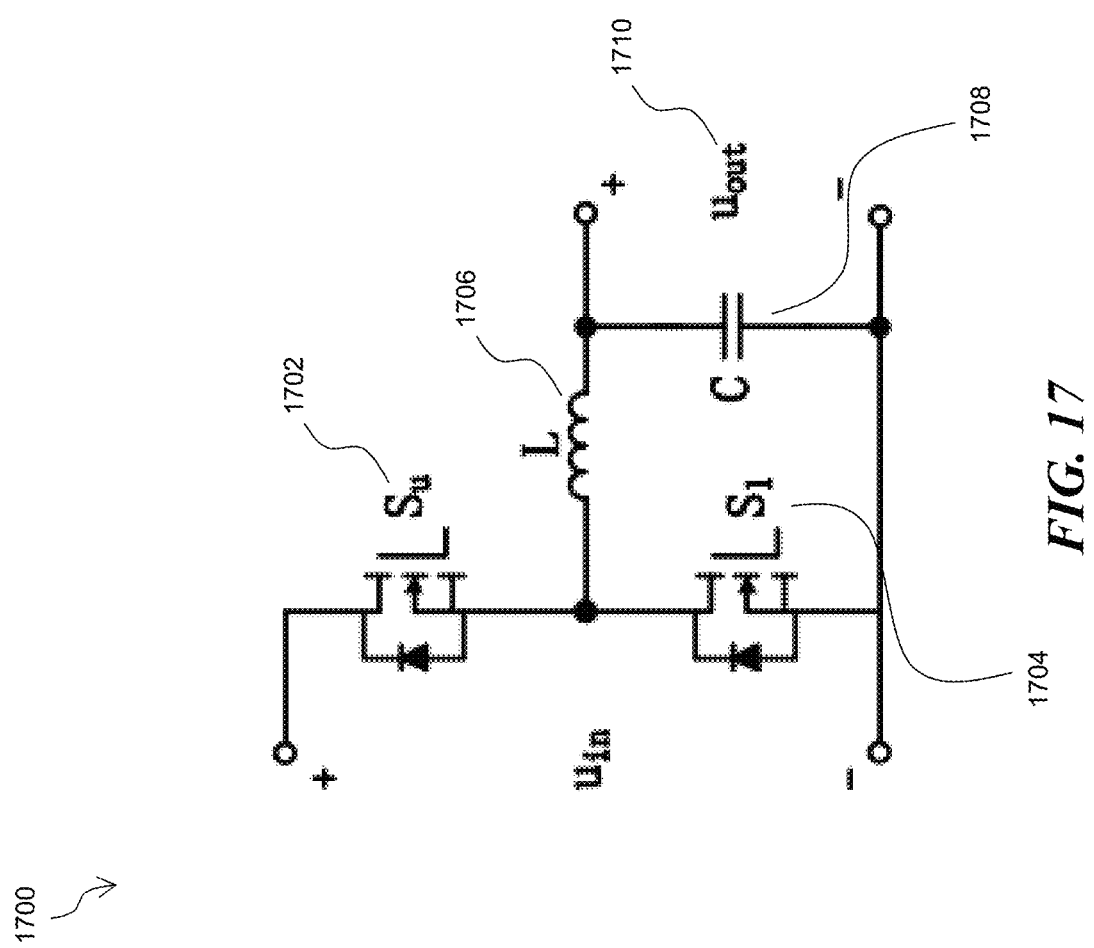
FIG. 17 shows a basic power module for use in a non-isolated DC charger, according to some embodiments of the present disclosure.

FIG. 17 shows a basic power module 1700 for use in a non-isolated DC charger, according to some embodiments of the present disclosure. Power module 1700 may herein be referred to as a "switch arm" or "phase leg" and may be used to form various converter and rectifier configurations. Power module 1700 may include an upper switch 1702, a lower switch 1704, an inductor 1706, and a capacitor 1708. In some embodiments, each of the upper switch and lower switch can include multiple parallel physical switches. In some embodiments, power module 1700 may include more than two levels of switches, such as three levels. In some embodiments, the inductor 1706 and capacitor 1708 may operate as an LC filter. The output voltage of the power module 1700 may be voltage 1710. The switches may be any switches with high current and voltage ratings. For example, the switches may be solid state switches. Example switches may include Si IGBTs (silicon insulated-gate bipolar transistors), Si, SiC MOSFETs (silicon carbide metal-oxide semiconductor field-effect transistors), such as Wolfspeed C2M0025120D SiC MOSFETs, GaN HEMT (gallium nitride high electron-mobility transistor). In some embodiments, in consideration of the power level 3 requirements of fast charging and the device rated current, 32 $A_{RMS}$ may be chosen to be the rated switch arm current. To provide a maximum fast charging power of 22 kW (e.g. to meet requirement for a power level 3 fast charger), the calculation of three phase AC power $$P_{3\varphi} = \sqrt{3} \, U_{line} I_{line} \cos \alpha \tag{11}$$

where $U_{line}$, $I_{line}$, and $\alpha$ may represent the grid line voltage, the line current, and the power factor, respectively. Because the three phase grid voltage is 400 V and 50 Hz (see FIG. 16), the rated switch arm current can be calculated as 32 $A_{RMS}$ with equation 11. Note this is an example calculation based on current grid requirements and the device rated current is not limited to 32 $A_{RMS}$. Equation 11 can be used to calculate a variety of device rated currents for a variety of applications that are not limited to the grid requirements illustrated in FIG. 16. In addition, it should be noted that the calculated device rated current should be calculated such that it does not exceed the switch drain-source current requirement that is safe for charging and discharging. This may be dependent on the specific switches chosen.

As a DC charger may be a two-stage energy conversion system, the second stage (the DC/DC converter) should be able to deliver a power of 22 kW from the DC bus to the battery. Note the 22 KW is an exemplary value that may conform with power level 3 fast chargers. Other "requirements" for the power that the converter should be able to deliver may vary with applications and levels of chargers.

In some embodiments, the safe voltage range of a Li-ion battery cell is around 2.7V-4.2V in electric vehicle applications. A typical battery voltage may be 400 V with 96 cells. A possible next generation battery may 800 V with 192 cells. Thus, the battery side output voltage may be designed to be in the range of 200 V to 650 V, depending on the number of cells. In some embodiments, the DC/DC converter may satisfy the maximum current under the minimum battery voltage (e.g. when the battery is empty). As an example, by calculating the DC/DC converter output current under a minimum output voltage of 200 V, at least three switch arms can be paralleled to satisfy the fast charging power level 3 (22 kW).

Equation 11 may be used to calculate circuit parameters for various charging systems (e.g. the systems of FIGS. 18-21). For example, the power factor ($\alpha$), grid line voltage (e.g. phase voltage $U_{line}$), and power requirement ($P_{3\varphi}$) may be given and used to calculate the phase current. From here, the number of switch arms can be derived accordingly based on the current capabilities of the power modules (e.g. peak power capability) and the steady-state capabilities (e.g. switch losses and cooling). In some embodiments, equation 1 may also be used to make similar design calculations but for single-phase systems. In a single-phase system, equation 1 would be the same except without the $\sqrt{3}$ factor and $P_{3\varphi}$ would be $P_{1\varphi}$. Additionally, for both single-phase and three-phase systems, the number of switch arms may be increased to increase the power rate. This can allow the charger to be used for much faster and more powerful applications.

In general, for single-phase grid interfaces, the AC side of the charger can include 2n power modules, while the DC side can include n modules and use of a full bridge rectifier topology of the AC side. For three-phase grid interfaces, both the AC and DC sides of the charger can have n power modules. Both three-phase and single-phase chargers can include a connection from the common point of the capacitors on both sides to the DC bus. FIGS. 18-21 show example topologies designed according to the present disclosure, though they are not limiting and merely examples of possible charger topologies based on interfacing with the grid as it currently exists.

Figure 18:
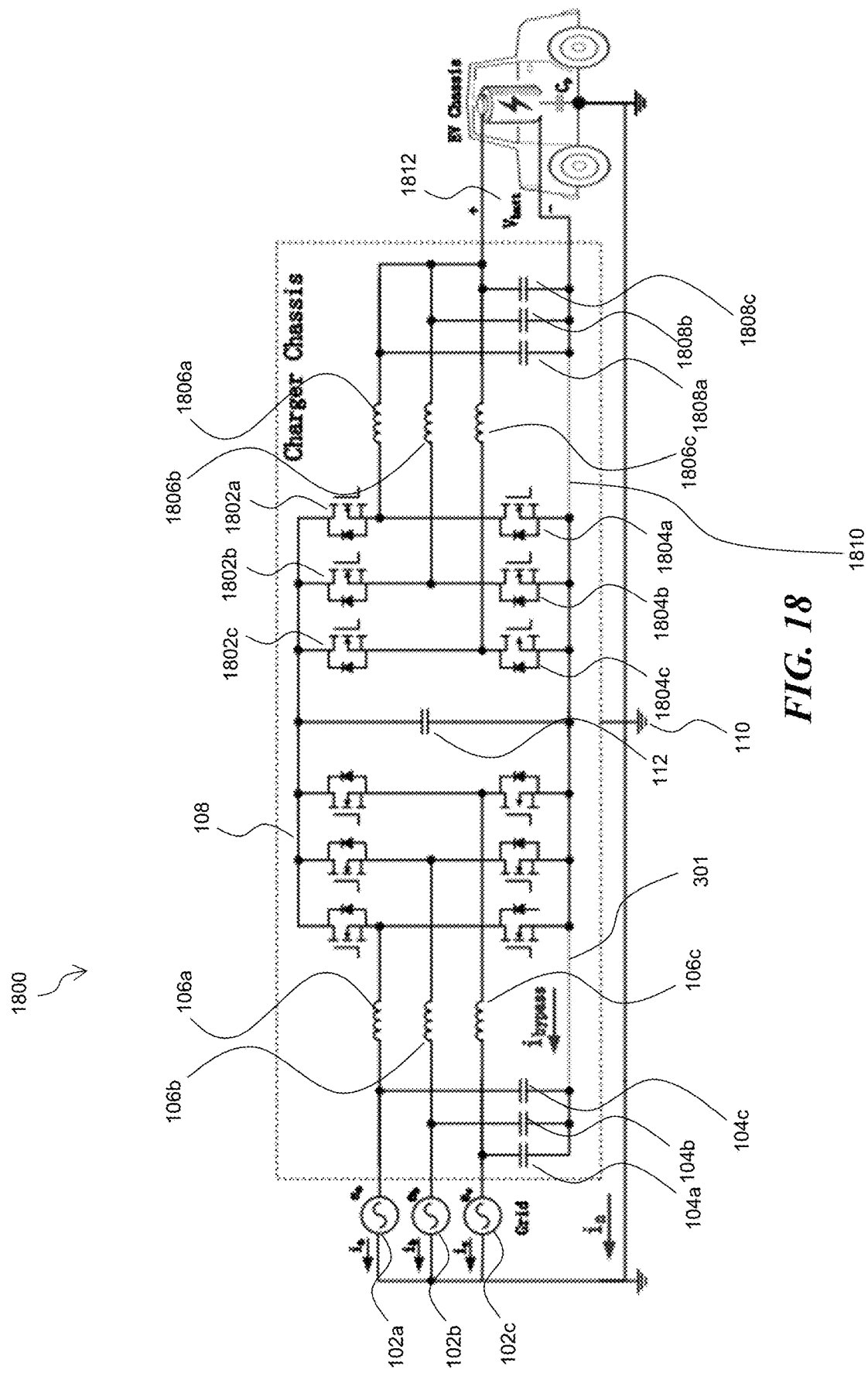
FIG. 18 shows a three-phase non-isolated charger topology, according to some embodiments of the present disclosure.

FIG. 18 shows a three-phase non-isolated charger topology 1800, according to some embodiments of the present disclosure. Charger 1800 may include a three-phase AC/DC rectifier according to the present disclosure with the same or similar elements as the system 300 of FIG. 3. Charger 1800 may include AC voltage sources 102a-c (e.g. representing the grid), a bank of three-capacitors 104a-c, a bank of three inductors 106a-c, an inverter-rectifier 108, a DC bus 112, and a ground connection 301 (e.g. to mitigate leakage currents in accordance with the present disclosure) connecting the neutral point of the capacitors 104 to the ground 110. Charger 1800 may also include a DC/DC converter, according to some embodiments of the present disclosure. The converter may be connected to the same DC bus 112. The converter may include six switches 1802a-c and 1804a-c, a bank of three inductors 1806a-c, and a bank of three capacitors 1808a-c. In other words, the converter may also be described as including three power modules, such as the power module described in relation to FIG. 17. For example, switches 1802c, 1804c, inductor 1806c, and capacitor 1808c may be a power module. The components with the a and b notations can also form switch arms. In some embodiments, the converter can include three parallel power modules, all of which yield output voltage 1812, which may be used to charge a battery (e.g. for an electric vehicle). Charger 1800 may also include a connection 1810, connecting the bank of capacitors 1808a-c to the same connection point as connection 301. In some embodiments, this may make the charger 1800 symmetric across the DC bus 112. This may simplify manufacturing and development and stimulate mass production, which may decrease costs in general to produce charging stations. Connection 1810 and the paralleled power modules may form a multi-leg (e.g. multi-switch arm) bi-directional buck converter. In some embodiments, each power module can be capable of delivering 32 $A_{DC}$ and 500-650 $V_{DC}$ to charge the battery. Note, these values may vary according to the original design parameters used. In some embodiments, number of power modules on both the AC and DC sides may be increased (e.g. doubled) to maintain symmetry but increase the charging power. For example, a three-phase with six switch arms can be used, which may yield a power rate of 44 kW, assuming the same design parameters.

Figure 19:
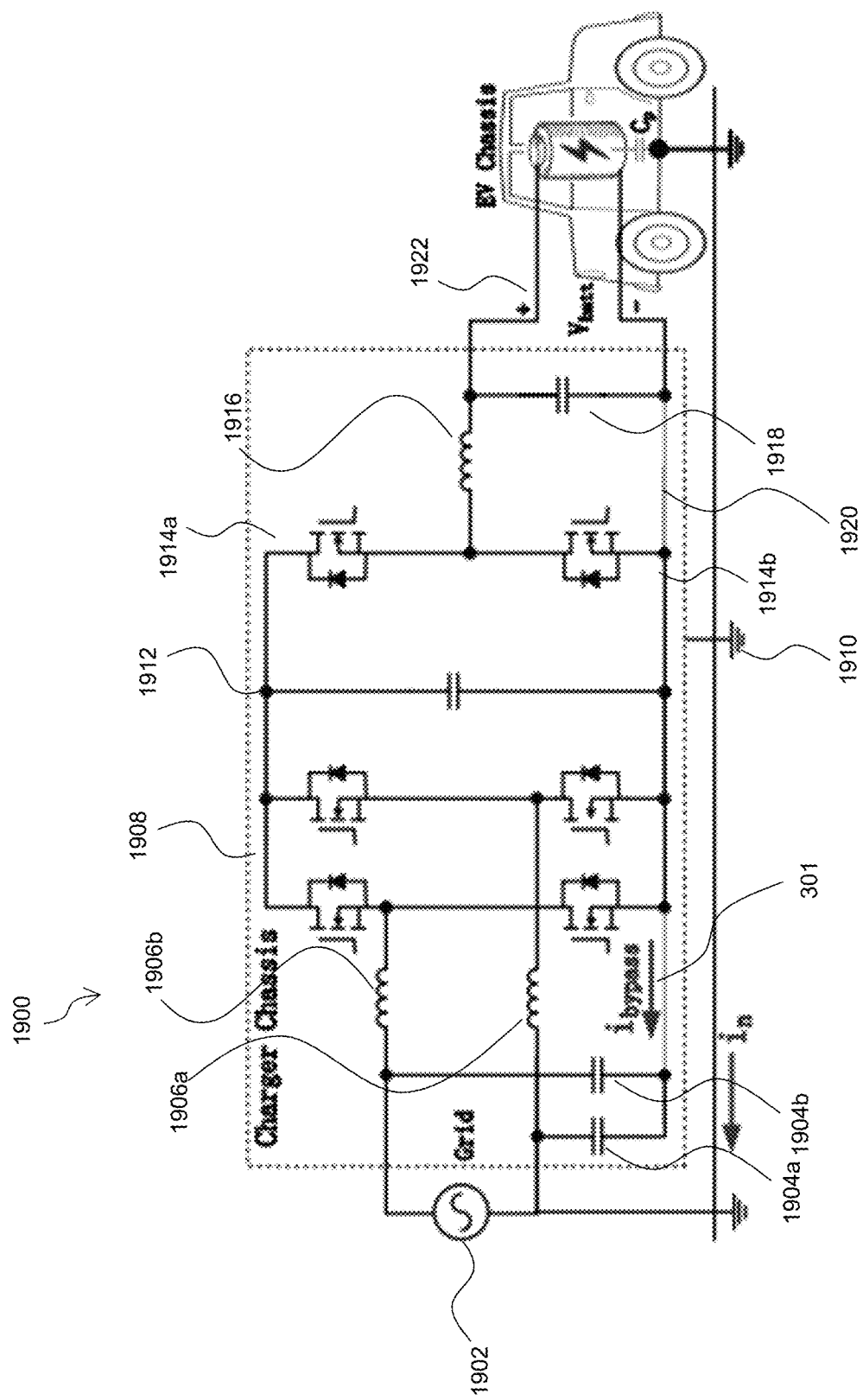
FIG. 19 shows a single-phase non-isolated charger topology, according to some embodiments of the present disclosure.

FIG. 19 shows a single-phase non-isolated charger topology 1900, according to some embodiments of the present disclosure. Charger 1900 may include a single-phase AC/DC rectifier according to the present disclosure with the same or similar elements as the system 300 of FIG. 3. Charger 1900 may include an AC voltage source 1902, a bank of two capacitors 1904a-b, a bank of two inductors 1906a-b, an inverter-rectifier 1908 (e.g. a full wave bridge rectifier), a ground 1910, a DC bus 1912, and a ground connection 301 (e.g. to mitigate leakage currents in accordance with the present disclosure) connecting the neutral point of the capacitors 1904 to the ground 1910. Charger 1900 may also include a DC/DC converter, according to some embodiments of the present disclosure. The converter may be connected to the same DC bus 112 via connection 1920. The converter may include two switches 1914a-b, an inductor 1916, and a capacitor 1918. In other words, the converter may also be described as including a switch arm or power modules, such as the power module described in relation to FIG. 17. For example, switches 1914a-b, inductor 1916, and capacitor 1918 may be a switch arm. The charger 1900 may have an output voltage 1922, which may be used to charge a battery (e.g. for an electric vehicle). Connection 1920, connecting the converter to the same DC bus 1912 as the rectifier may make the charger 1900 partially symmetric across the DC bus 1912. This may simplify manufacturing and development and stimulate mass production, which may decrease costs in general to produce charging stations.

In some embodiments, an issue that may be considered for a single-phase charger (e.g. charger 1900 of FIG. 19) is the fluctuating power on the DC bus (e.g. DC Bus 1912). In some embodiments, there can be a second-order frequency power oscillation on the DC side (converter side) due to the sinusoidal grid power, which may superimpose a ripple power onto the constant DC power. The ripple power may be described by $$P = ui = \frac{1}{2} V I (1 + \cos 2\omega t) \qquad (12)$$

where P is the input grid power, V and I are the grid voltage and current, t is time, and ω is the grid frequency. A ripple voltage $u_{dc}(t)$ may oscillate on the DC bus with the same frequency $$u_{dc}(t) = \sqrt{\frac{V\ I}{2\omega C_{dc}} \sin(2\omega t) + U_0^2} \qquad (13)$$

where $C_{DC}$ is the DC capacitance and $U_0$ is the output DC voltage. In some embodiments, a large capacitance value for the capacitor can be used to manage the DC ripple voltage without adding an extra decoupling circuit.

Figure 20:
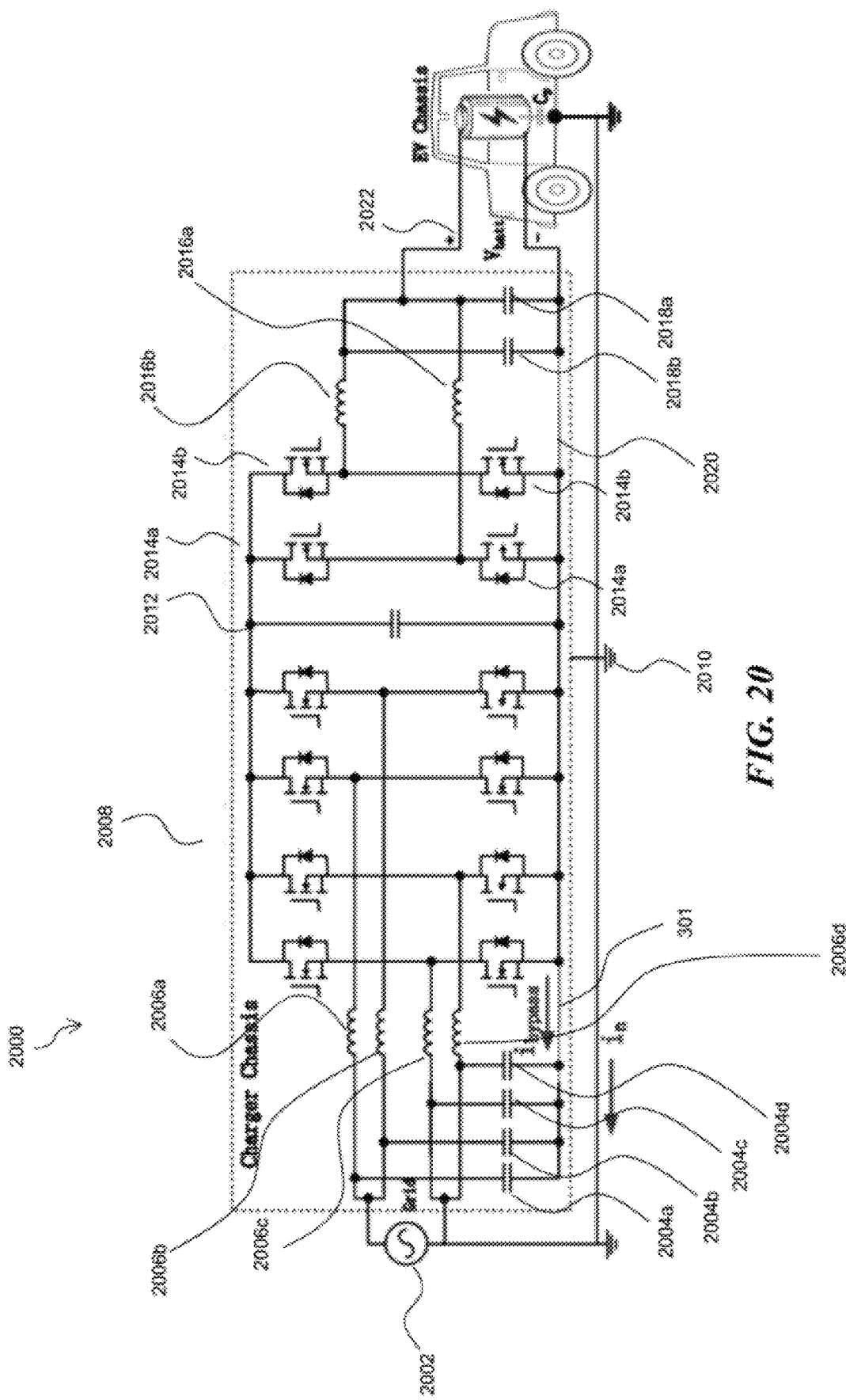
FIG. 20 shows another single-phase non-isolated charger topology, according to some embodiments of the present disclosure.

FIG. 20 shows another single-phase non-isolated charger topology 2000, according to some embodiments of the present disclosure. In some embodiments, charger 2000 may include more parallel power modules and switch arms than charger 1900 to increase the power output. Charger 2000 may include a single-phase rectifier according to the present disclosure with the same or similar elements as the system 300 of FIG. 3. Charger 2000 may include an AC voltage source 2002, a bank of four capacitors 2004a-d, a bank of four inductors 2006a-d, an inverter-rectifier 2008, a DC bus 2012, and a ground connection 301 (e.g. to mitigate leakage currents in accordance with the present disclosure) connecting the neutral point of the capacitors 2004a-d to the ground 2010. Charger 2000 may also include a DC/DC converter, according to some embodiments of the present disclosure. The converter may be connected to the same DC bus 2012. The converter may include four switches, inductors 2016a-b, and capacitors 2018a-b. The converter may also be described as including two power modules, such as the power module described in relation to FIG. 17. For example, switches 2014a, inductor 2016a, and capacitor 2018a may form a power module (likewise with the "b" components). The charger 2000 may have an output voltage 2022, which may be used to charge a battery (e.g. for an electric vehicle). Connection 2020, connecting the converter to the same DC bus 2012 as the inverter-rectifier 2008 may make the charger 2000 partially symmetric across the DC bus 2012. This may simplify manufacturing and development and stimulate mass production, which may decrease costs in general to produce charging stations. Charger 2000 may have double the power rate of charger 1900.

In some embodiments, the volume and weight of the charging system is less than that of charging systems that utilize transformers. In some embodiments, the components of the charging system can be placed into a packaging box of 450×400×200 mm, with an enclosure volume of 0.036 cubic meters. Note, this is an example dimension that illustrates a reduction in size and volume and is not limiting.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. A system for mitigating leakage currents in a charging station for electric vehicles comprising:
    a bank of one or more parallel capacitors per phase electrically coupled to an AC voltage source, wherein a neutral point of the one or more parallel capacitors is electrically coupled to a DC ground;
    a bank of one or more inductors per phase electrically coupled to the one or more parallel capacitors, wherein each inductor is in series with and downstream from one capacitor;
    a rectifier electrically coupled to and downstream from the one or more parallel inductors, wherein the rectifier converts the AC voltage source to a DC voltage for supply to a battery;
    a DC bus electrically coupled to the rectifier; and
    a controller configured to mitigate leakage currents by controlling a voltage of at least one of the bank of one or more parallel capacitors.

2. The system of claim 1, wherein the rectifier is a three-phase rectifier.

3. The system of claim 1, wherein the rectifier is a single-phase rectifier.

4. The system of claim 1, wherein controlling the voltage of at least one of the bank of one or more parallel capacitors comprises stabilizing a zero component voltage around a pre-determined value.

5. The system of claim 4, wherein the pre-determined value is one of:
half of a voltage across the DC bus; or
a periodic waveform, wherein an average of the periodic waveform is half the voltage across the DC bus.

6. The system of claim 4, wherein stabilizing the zero component voltage comprises driving a zero component of the current through at least one of the one or more parallel inductors to a desired current value.

7. The system of claim 6, wherein driving the zero component of the current through at least one of the one or more parallel inductors comprises applying a DC offset voltage by the rectifier.

8. The system of claim 1, wherein at least one of the inductors comprises an e-core, 44 turns of Litz wire, and a high frequency ferrite material.

9. The system of claim 1, wherein the controller is a proportional-integral (PI) controller.

10. The system of claim 1, wherein the controller is configured to limit current provided by the rectifier to protect switching devices in the system.

11. A method for mitigating leakage currents in a charging station for electric vehicles, wherein the charging station comprises an LC filter comprising a bank of one or more parallel capacitors per phase electrically coupled to and in series with a bank of one or more parallel inductors, a DC bus, and a rectifier, wherein a neutral point of the one or more parallel capacitors is electrically coupled to a DC ground, comprising:
determining a grid phase with a phase-locked loop (PLL) method;
determining d-, q-, and 0-components of a voltage across the bank of capacitors, a grid current, and a current through the bank of inductors, wherein each of the voltage, the grid current, and the current through the bank of inductors is measured or estimated;
controlling a reactive current within the charging station;
controlling an active power of the charging station;
determining the 0-component of the current through the bank of inductors that will control the 0-component of the voltage across the bank of capacitors;
determining a driving voltage to be applied by the rectifier; and
causing the rectifier to apply the driving voltage.

12. The method of claim 11 comprising limiting current provided by the rectifier to protect switching devices in the charging station.

13. The method of claim 11 comprising using impedance matching to determine a desired reactive current to generate a pre-defined reactive power in the charging station.

14. The method of claim 13, wherein controlling the reactive current comprises at least one of absorbing reactive current from and providing reactive current to the charging station.

15. The method of claim 11, wherein controlling the active power of the charging station comprises holding a voltage across the DC bus constant.

16. The method of claim 11, wherein controlling the 0-component of the voltage across the bank of capacitors comprises stabilizing the 0-component around a pre-determined value.

17. The method of claim 16, wherein the pre-determined value is one of:
half of a voltage across the DC bus; or
a periodic waveform, wherein an average of the periodic waveform is half the voltage across the DC bus.

18. The method of claim 11, wherein at least one of the inductors comprises an e-core, 44 turns of Litz wire, and a high frequency ferrite material.

19. The method of claim 11, wherein the method is performed by at least one PI controller.

20. A system for mitigating leakage currents in a charging station for electric vehicles comprising:
a three-phase LC filter to smooth an AC voltage source;
a three-phase rectifier electrically coupled to the LC filter;
a DC bus, wherein a neutral point of the LC filter is connected to a DC ground; and
a controller configured to mitigate leakage currents by controlling a voltage of at least one capacitor in the LC filter.

* * * * *